(12) United States Patent
Hunter

(10) Patent No.: US 6,253,890 B1
(45) Date of Patent: Jul. 3, 2001

(54) AIR BRAKES FOR TRUCKS

(76) Inventor: Marc Hunter, 6310 Walker Road, Port Alberni, British Columbia (CA), V9Y 7L8

( * ) Notice: Subject to any disclaimer, the term of this patent is extended or adjusted under 35 U.S.C. 154(b) by 0 days.

(21) Appl. No.: 09/335,147

(22) Filed: Jun. 17, 1999

(51) Int. Cl.$^7$ .................................................... F16D 51/00
(52) U.S. Cl. .................................................... 188/325
(58) Field of Search .............................. 188/78, 325, 327

(56) References Cited

U.S. PATENT DOCUMENTS

| | | | |
|---|---|---|---|
| 2,111,755 | * 3/1938 | Compton | 188/106 |
| 2,137,991 | * 11/1938 | Londe | 188/106 |
| 2,215,547 | * 9/1940 | Dick | 188/79.5 |
| 2,266,727 | * 12/1941 | Ambrose | 188/152 |
| 2,331,652 | 10/1943 | Buckendale . | |
| 2,409,908 | 10/1946 | Simpkins . | |
| 2,516,160 | 7/1950 | Super . | |
| 2,700,437 | * 1/1955 | Murphy | 188/76 |
| 2,755,890 | 7/1956 | Scheel . | |
| 2,949,171 | 8/1960 | Kissinger . | |
| 4,702,352 | 10/1987 | Ingram et al. . | |
| 4,887,698 | 12/1989 | Hunt et al. . | |
| 5,246,093 | 9/1993 | Wang . | |
| 5,531,298 | 7/1996 | Brooks, Sr. et al. . | |
| 5,865,277 | 2/1999 | Hunter . | |

* cited by examiner

Primary Examiner—Robert J. Oberleitner
Assistant Examiner—Benjamin A. Pezzlo
(74) Attorney, Agent, or Firm—Wood, Phillips, VanSanten, Clark & Mortimer

(57) ABSTRACT

The present invention provides an improvement in an actuator system for use with a brake system of the type including a brake and a source of compressed air which is connected to an air chamber including a push rod for moving a transverse brake actuator bar between a brake applied position and a brake released position. The push rod operates the transverse brake actuator bar. The actuator system includes an asymmetric operator member which is relatively-rotatably-attached to a non-rotatable wheel support, and which is concentrically-disposed around an axle of a wheel. The asymmetric operator member includes an ear which is attached to the transverse brake actuator bar. A brake arm assembly includes a pair of diametrically-opposed arcuate brake arms, each brake arm including an inner arcuate channel member, one end of the arcuate channel member terminating in a hollow cylindrical bushing, the other end of the channel member terminating in a pair of transversely-spaced-apart ears having aligned apertures therethrough. An inner anchor plate and an outer anchor plate sandwich the asymmetric operator member therebetween and also are relatively-rotatably-attached to the non-rotatable wheel support which is concentrically-disposed around the axle of the wheel. The anchor plates are non-rotatably-secured to the asymmetric operator member. A first bifurcated link is rotatably-attached between the ears of a first channel member and the anchor plates, and a second bifurcated link is rotatably-attached between the ears of a second channel member and the anchor plates. A first hollow cylindrical bushing is rotatably-attached to the anchor plates opposite to the attachment of the second bifurcated link, and a second hollow cylindrical bushing is rotatably-attached to the anchor plates opposite to the attachment of the first bifurcated link. On activating the air pot, the push rod moves the transverse actuator bar to rotate the asymmetric operator member in a counter-clockwise direction, to urge the arcuate brake arm to move in a braking action radially-outwardly from an inactive position towards, and frictionally-engaging, radially-inwardly-facing brake pads, and on venting compressed air from the air pot, the push rod moves the transverse actuator bar to rotate the asymmetric operator member in a clockwise direction, to urge the arcuate brake arms to move in a brake releasing action radially-inwardly to inactive positions away from, and out of frictional engagement with, the radially-inwardly-facing brake pads.

22 Claims, 11 Drawing Sheets

AIR BRAKES FOR TRUCKS

BACKGROUND OF THE INVENTION (i) Related Invention

This invention is an improvement on U.S. Pat. No. 5,865,277, patented Feb. 2, 1999, by Marc Hunter, the entire contents of which are incorporated herein by reference.

(ii) Field of the Invention

This invention relates to a brake system and brake actuator system for trucks. In one embodiment, it is particularly concerned with pneumatic air braking systems which are used on large trucks which are used in the forestry trucking industry.

(iii) Description of the Prior Art

Drum brakes are known to have certain advantages over disc brakes. Those advantages include superior braking force in some situations, and, the continued application of braking force where temperature variations occur while the brake is on.

A problem, however, with prior art drum brake assemblies was that they were of complex construction and assembly, and they were generally comprised of a large number of components and parts. Such a large number of parts resulted in the brake assembly being expensive, and time-consuming to both assemble and to fix to a vehicle.

A further problem with drum-type parking brake assemblies was that the drum shoe friction linings did not become properly-bedded by wearing against the inner surface of the drum. Unless there was a near-perfect match between the diameters of the lining when the brake was applied and the drum, the drum shoe would not properly-contact the drum over its entire surface and thus, an inferior braking force would result.

Drum brakes which included a plurality of brake shoes which were expanded within a brake drum attached to a wheel, required an actuating system to expand the brake shoes. In one type of actuating mechanism, the shoes were expanded by a cam, which was mounted on a shaft which was supported by bearings carried by a backing plate and by a spaced support which was fixed to an un-sprung part of the vehicle. The cam shaft generally extended between the backing plate and the spaced support in a direction which was substantially-parallel to the axle or to the axle housing to which the backing plate was fixed.

In mechanisms of the above-described type, the spaced support was welded or bolted to the axle or to the housing itself. In either case, however, the cam shaft bearings in the backing plate and in the support had to be in exact alignment to prevent binding of the cam shaft therein when completely assembled. It was known that, after the bracket was welded or bolted into place, unless extreme care was taken, the bearing in the bracket did not exactly align with the bearing in the backing plate. This caused the shaft to bind in its bearings. When the parts were welded into place, for maximum strength, the difficulties of securing proper bearing alignment were increased. During the manufacture of the backing plate and the support, they were stamped or otherwise formed, and usually had the necessary holes, etc., bored into them before they were welded to the axle or to the housing. While the customary jigs or other devices could be used to hold them in position during welding, it was extremely-difficult to hold them in the exact desired position so that when welded into place they would be properly-aligned for the attachment of other parts. It was also necessary accurately to machine the parts. Such proper alignment was particularly-necessary in the case of the spaced-bearings for the cam shaft.

Conventional brake mechanisms for automobile and truck wheels usually included a cylindrical brake drum which was mounted for rotation with each wheel. Pairs of semi-cylindrical brake shoes were mounted on the opposite sides of an axle housing for pivotal movement inwardly and outwardly between expanded and contracted positions. Brake linings were positioned between the brake shoes and the brake drums and were compressed therebetween incident to brake shoe expansion. Cams were positioned between free ends of the brake shoes for urging them into expanded positions and releasing them for spring contraction. The cams were controlled by linkages which were connected to a foot pedal or hand lever of the vehicle. When the brake lining wore out there was brake failure and the cam was normally ineffective to apply the brakes in such a manner as to stop the vehicle. This could also result from excessive heating and expansion of the brake drums so that proper shoe engagement could not be attained.

One current drum brake system has shoes that make contact with the drum. The wheel cylinder activates the shoes at the top, while there is separate linkage that is operated by a cable which throws out the shoes to come into contact with the drum. It also needs to be adjusted, but often it becomes rusty and therefore is not possible to adjust.

In most drum brakes, whether actuated manually, hydraulically or pneumatically, the arcuate brake shoes were interconnected by retraction springs. When the brakes were not applied, the brake shoes were held away from the rotating drum by the retraction springs. When the brakes were applied, e.g., in a hydraulic or pneumatic system, pressurization of the hydraulic or pneumatic cylinder forced the piston links outwardly from the cylinder against the brake shoes and caused the brake shoes to engage the rotating brake drum.

However, it was found in practice that the retraction springs occasionally became inoperative. The need, therefore, arose to provide brakes whose retraction was not provided by spring means, but which would be positively-actuated.

Heretofore, it was also a conventional practice in brake constructions to utilize relatively-inflexible brake shoes which had generally been reinforced against flexing by stiffening webs. Such brake shoes were pressed against a rotating drum by applying a force to an end of one shoe by means, e.g., of a pneumatic cylinder, or of a hydraulic cylinder, and provided an anchor at an opposite end of the shoe for anchoring the shoe against the circumferential-movement with the drum. It was also a conventional practice in such constructions to link together a pair of torque shoes at adjacent ends, whereby a single cylinder could be utilized for applying an actuating force at a free end or at an opposite end of a first shoe in the pair and whereby a single anchor could be located at the adjacent free end of a second shoe in the pair to receive friction forces which were developed along the surfaces of both of the shoes of the pair. In the latter arrangement, the frictional force which developed along the surface of the first shoe was transmitted to an end of the second shoe as an actuating force.

In conventional air brake systems, pressurized air was supplied by way of a service brake (control) line and an emergency brake (supply) line. The control line is connected through a relay valve to operate service brakes which are associated with each wheel pneumatically. In order to assure that the service system had adequate volume to provide for repeated service brake applications, the braking system further included a service reservoir or tank which was connected through the relay valve so that pressure may be supplied to the service brakes from a relatively large storage volume. The reservoir was pressurized through the supply (emergency) pressurization system which also provided pressure to the emergency or parking brakes of the vehicle. The emergency or parking brakes were generally spring-operated with the force of the springs being offset to release the brakes by the use of pressure within the emergency supply system.

In the pneumatic system of prior art air brake systems, the emergency brake was either an air pot with an auxiliary air tank separate from air lines, or a separate system which was reliant on the S-cam system. In such pneumatic system, when the air lines lost air pressure, a valve sensed the loss of air pressure and let all the air from the auxiliary tank. The air would eventually seep out and leave no pressure in the air pots. Thus, it was necessary to use blocks of wood as a back-up.

The S-cam system worked differently. It was not reliant on an auxiliary air tank, since this system included a spring in the air pot. When brake pressure was applied it compressed the spring, thus alleviating pressure from the shoes. A problem with such brakes is that a failure of the spring operating system could result in brakes loosing their braking power, resulting in dangerous operation of the vehicle.

Failure of conventional brakes was frequently-experienced on trucks, truck-trailers, or semi-trucks especially when carrying heavy loads. This usually occurred when the truck was descending a steep grade requiring repeated application of the brakes necessary to maintain a controllable speed. Runaway trucks, due to brake failure, have caused the loss of many lives of truck drivers and motorists in the paths of the trucks, and caused the loss of valuable cargo.

As noted above, the brakes were operated by brake actuators. Brake actuators of numerous configurations are thus known. Mechanical drum brake actuators generally operated to transmit force which was generally applied by a cable mechanism to two semi-circular brake shoes, thereby applying force to a brake drum and achieving the braking function. A conventional brake actuator typically forced the shoes against the drum through a piston or strut that was connected to an operator. Such brake actuators generally included an undesirable number of component parts which complicated assembly and typically permitted undesirable vertical or transverse movement of the mating shoe ends.

The prior art has provided mechanical brake actuators for shoe-drum brakes. In one known form of such an actuator, a force input lever and strut member were pivotally-interconnected and were adapted for engagement respectively with outer end portions of the shoes of a drum brake. The actuator was expandable by application of force to the lever in order to apply the shoes to the brake drum. In this known actuator, portions of the lever and strut member were supported for sliding-movement parallel to the brake backplate on surfaces fixed relative to the backplate, in order to react forces generated in these components in one direction perpendicular to the backplate. Such sliding-movement can, however, be undesirable in that it tended to adversely-affect the brake efficiency.

It was also known to provide a one-piece mechanism in the form of a strut which engaged the webs of a pair of brake shoes. The strut was pivotable in order to expand the shoes and was supported on a surface of a fixed abutment member by way of a roller engaging a surface of the member adjacent to the brake backplate.

As noted above, trucks and trailers were generally provided with a diaphragm chamber into which air was forced for operating a lever for applying the brakes. If, for any reason, there should be a failure of the compressor to keep the proper amount of pressure in the pressure storage tank, or should an air-leak develop and thus bring about an emergency, or if the driver was descending down a steep hill and he suddenly found out there was not enough air pressure to apply the brakes, the results of this can be disastrous to the driver of the truck, other drivers, or to the contents of the truck.

The problem was said to be solved by the prior art by providing additional means which were a combination of both pneumatically-operated means and spring means which are adapted to cooperate with the brake mechanism of the truck, tractor or trailer for insuring that the above-recited accidents cannot happen. The conventional braking mechanism may be used wherein compressed air was allowed to flow into diaphragm chambers for applying brakes. The brake operating means may also include a suitable auxiliary mechanism with a compression spring which was biased to apply the brakes, but, by admitting compressed air to this auxiliary mechanism, this tendency of the spring was overcome and it was impossible for this spring to apply the brakes. However, if there should be a failure of air pressure, or a decreasing in the air pressure, the auxiliary mechanism would tend slowly to apply the brake. In the case of an abrupt failure of air pressure, whereby the operator would be powerless to apply the brakes, the auxiliary mechanism would be automatically released and its spring, which was ordinarily held in the inoperative position by the air pressure, would then become active and would automatically apply the brakes.

In recent years, much effort was spent on trying to develop a satisfactory mounting structure for the fluid motor, the cam shaft, and the associated interconnecting linkage of fluid-powered, cam-actuated brake mechanisms of heavy duty vehicles.

The problems to be solved in such mounting structures were numerous. One of the major problems in such mountings was the location of the fluid motor, which had to be in such a position that it could not be damaged by obstacles in the path of the vehicle. A second problem was in the mounting of the fluid motor, which had to be in such a manner that the cam shaft of the actuating mechanism was not subject to deflection when the brakes were energized. A third problem was in the mounting of the fluid motor and associated linkage, in which the cam shaft bearings had to be accurately-axially-aligned and the cam shaft axis had to be properly located relative to the brake shoes. A fourth problem was that the fluid motor of such actuating mechanisms had to be so mounted that there was no interference with the spring suspension or with the axle stabilization linkages.

Due to the many various forms of axles and stabilization mechanisms therefor, it has been necessary in the past to provide an entirely-different mounting structure for each of the various forms of axles and associated stabilization mechanisms rather than providing mounting structures which are of general applicability.

An accepted prior art commercial design in the air brake field had been to mount the actuating diaphragm or cylinder on the axle, with its axis normal to the axis of rotation of the brake cam shaft which extended parallel to the axis of rotation of the wheel to be braked. It was necessary to mount the actuator on the axle well towards the longitudinal center line of the vehicle in order to avoid interference with springs, radius rods, torque rods and other vehicle parts. Hence, the cam shaft was relatively-long and was supported at opposite ends in bearings in the bracket by which the actuator was mounted on the axle and in the brake backing plate respectively. This arrangement required special actuator mounting brackets which had to be accurately-located to align the cam shaft bearings. The undesirably long cam shaft was also difficult to align and then to maintain in alignment. It also had a tendency to bend during assembly and during high braking torque conditions while in operation.

Many patents have been proposed to solve the problems recited above.

U.S. Pat. No. 2,331,652, patented Oct. 12, 1943, by Lawrence R. Buckendale and assigned to The Timken-Detroit Axle Company, provided a brake mechanism, including clamping means for adjustably-clamping the bearing member carried by the support and thus permitting rocking of the bearing through a sufficient range to compensate for any misalignment during assembly. After assembly, the bearing, which had been properly located in the support to eliminate any binding of the cam shaft, was clamped against further movement, and thereafter under operating conditions both cam shaft bearings were thus held in a fixed position. This patent thus disclosed a brake mechanism in which fluid actuated motors and associated linkages were located in such a position relative to the axle housing that they were to a large extent protected from damage by road obstacles in the path of the vehicles.

U.S. Pat. No. 2,409,908, patented Oct. 22, 1946, by Isaac W. Simpkins, provided an improvement in a vehicle which had a pair of wheels which were equipped with conventional brakes as well as a brake lever. A diaphragm housing and piston were connected to the lever. A source of fluid under pressure was provided for admission to the diaphragm housing for moving the lever to apply the brakes. A second lever was connected to the first lever and had a cable extending therefrom. There was a compression spring secured to the cable which normally tended to move the brake lever to apply the brakes. There was also a connection between the spring and the source of compressed fluid for normally holding the spring against actuation of the second lever, as long as a predetermined pressure was present in the source of compressed fluid.

U.S. Pat. No. 2,516,160, patented Jul. 25, 1950, to Ralph K. Super and assigned to Timken-Detroit Axle Company, provided an improvement in an axle assembly wherein a wheel brake mechanism had a rotatable operating shaft which was mounted on a non-rotatable part of the axle. Also included was a fluid motor, an external flange on the non-rotatable axle part, and a motion transmitting mechanism interconnecting the motor and shaft so that actuation of the motor rotated the shaft to control the brake mechanism. It also included means for mounting the motor on the non-rotatable axle part with its axis substantially-parallel to the axis of the axle. Such means also included a common mounting bracket for the brake mechanism and motor attached to the flange and had an angularly-related motor support portion extending along the non-rotatable axle part away from the brake mechanism.

U.S. Pat. No. 4,702,352, dated Oct. 27, 1987, to Brian Ingram et al and assigned to Lucas Industries Public Limited Co., provided an automatic adjuster including a strut having two parts between which there was a non-reversible screw-threaded connection which permitted the effective length of the strut to be increased by relative rotation between the parts under the influence of an adjuster device. The adjuster device incorporated clutch means for controlling the relative rotation in response to the occurrence of excessive clearance between braking surfaces. One of the adjuster parts was coupled by unidirectional means to a relatively-fixed part of the adjuster to resist rotation of one adjuster part in a de-adjusting direction, but to permit rotation thereof in the adjusting position. In one convenient arrangement, the unidirectional means comprised two parts which were independently-movable axially, but which were keyed against relative rotation. One of the parts was non-rotatably-engaged with one adjuster part and the other of the parts was releasably-uni-directionally-coupled to the relatively-fixed part. The unidirectional means preferably included a pawl which was engagable with a ratchet on the relatively-fixed part. Conveniently, the ratchet could be of annular form and the unidirectional means had angularly-spaced arms, each carrying a pawl for arrangement with the ratchet.

U.S. Pat. No. 2,755,890, patented Jul. 24, 1956, by Walther F. Scheel and assigned to Rockwell Spring and Axle Company was directed to improvements in vehicle brake actuating mechanisms and was directed to novel mounting structures by which the cam shaft, its operating linkage, and an air or other fluid pressure powered motor could be mounted at varying distances from the wheel within the longitudinally-projected profile of the axle housing and without interference with the spring or other undergear of the vehicle. Special brackets were mounted in a novel manner upon an axle-mounted brake support that carried the brake shoes and associated parts. The brackets supported the fluid pressure motor, the brake cam shaft and the actuating connections therebetween. Thus, the patent provided, in combination, an axle housing, a brake mounting spider fixed to the axle housing adjacent to one end thereof, and brake shoe pivots on the spider at one side of the housing. A first brake actuating cam shaft bearing was mounted on the spider at the side thereof opposite to the brake shoe pivots. A longitudinally-apertured cam shaft support tube, and means for removably-mounting the tube upon the spider in coaxial-alignment with the bearing was provided and included interfitting pilot portions on the spider and one end of the tube. A second cam shaft bearing was provided within the end of the tube opposite to the spider. A motor mounting bracket, and means for removably-mounting the bracket on the other end of the tube in any of a plurality of positions which were angularly-displaced about the axis of the tube was provided for optimum protective location of the motor on the axle housing. A cam shaft was rotatably-mounted in the bearings and projected at its ends from the spider and from the tube. A motor was mounted on the bracket and was operatively-connected to the cam shaft.

Another patent was U.S. Pat. No. 2,949,171, patented Aug. 16, 1960, by Stanley P. Kissinger, provided an emergency brake controlling apparatus whereby, during normal operation, the brake shoes were expanded by rotation of a cam in the usual manner. The patented invention provided the combination with a support, of a pair of elongated controlled elements, and means pivotally-mounting the elements in the support for movement towards and away from each other. An apparatus was provided for controlling the movement of the elements and included receptacles which were connected to the elements and had opposed recesses. One of the recesses was substantially-semi-cylindrical and the other recess was fractionally-spherical. The semi-cylindrical recess was substantially-concentric to an axis which was parallel to the pivot axis of one of the elements.

A telescopically-adjustable control member including a first end portion having a substantially-semi-cylindrical end key was complementarily-movably-fitted in the semi-cylindrical recess for pivotal movement around the axis of the semi-cylindrical recess, but was locked against rotation relative to its receptacle. A second end portion was expansible and contractible relative to the first end portion and had a fractionally-spherical, ball-shaped end which was complementarily-universally-fitted in the fractionally-spherical recess. Means were connected to the control member for effecting expansion and contraction thereof.

U.S. Pat. No. 4,887,698, patented Dec. 19, 1989, to Timothy J. Hunt et al and assigned to Lucas Industries Public Limited Company provided a mechanical brake actuator for a shoe drum brake. The mechanical brake actuator comprised an assembly which included a pair of pivotally-interconnected parts for co-action respectively with the brake shoes. One part was connectable to force-applying means and the other part extended, in use, between its associated shoe and the one part to form a strut, the parts were pivotally-interconnected by a pivot member which carried at least one roller arranged to engage, in use, a surface fixed relative to a backplate carrying the shoes. In one convenient arrangement, the fixed surface which was engaged by the roller was spaced inwardly from the backplate. Conveniently, it was on an abutment member on the backplate and was engageable by the adjacent shoe ends. Typically, in such an arrangement, the fixed surface was at the side of the shoe webs remote from the backplate. A pair of rollers could then be carried by the pivot member and arranged at either side of the actuator assembly. The rollers respectively-engaged surfaces of the abutment member at either side of the slot therein. Typically, the pivotal axis between the two actuator parts lay between the locations of engagement, in use, between these parts and the respective shoes.

U.S. Pat. No. 5,246,093, patented Sep. 21, 1993, to Nui Wang and assigned to Brake & Clutch Industries Australia Pty Ltd., provided a drum brake assembly which included a drum which was rotatable on an axis and had a radially-inner cylindrical surface, which formed a braking surface. A support and a brake member or a shoe was mounted on the support and was movable relative thereto. The brake shoe was of substantially-circular form and had a radially-outer face and at least one friction lining mounted thereto on the outer face and extended around the circular form. Actuating means, when actuated, caused the brake shoe to diametrically-expand such that the lining of the shoe contacted the inner surface of the drum and thereby provided a braking action to the drum. The shoe was of substantially-constant cross-sectional form along at least a major portion of its length. The cross-sectional form and the material from which the shoe body was made of was such that the shoe provided significant support for the lining along the entire length of the lining. The resilience of the shoe body was such that when the actuating means was released, the shoe diametrically-contracted to move the lining out of contact with the inner surface of the drum.

Still another patent was U.S. Pat. No. 5,531,298, dated Jul. 21, 1996, by Frank W. Brooks, Sr. et al and assigned to General Motors Corporation, provided a Brake Actuator. The patented brake actuator included an anchor which served the purposes of providing a housing and mounting features. Two pistons were slidably-carried by the anchor. A lever which engaged one of the pistons, and a strut, were pivotally-interconnected with the lever and engaged the other piston. Application of input force to the lever was transmitted therethrough and through the strut to the two pistons which were forced to move linearly in opposing directions to provide movement to the brake shoe and effect braking forces. The patented brake actuator included an anchor which had a mounting flange with an opening and had a bore which was oriented substantially-perpendicular to the opening. A first piston which had a first slot with a first socket was slidably-carried in the bore and engaged one brake shoe end. A second piston which had a second slot with a second socket was carried in the bore and engaged the other brake shoe end. A lever which had a third socket, extended through the opening of the anchor, engaged the first piston in the first socket and had a stop. A reversible strut which had a first cylindrical segment engaged the second piston in the second socket and had a second cylindrical segment which engaged the lever in the third socket, the first and second cylindrical segments were connected by a neck which was engageable by the stop of the lever.

SUMMARY OF THE INVENTION (i) Aims of the Invention

One object of the present invention is to provide a pneumatic braking system for large trucks which provides a maximum possible safety despite being of a simple design.

A second object of the present invention is to provide an improved mounting structure for the fluid motor shaft, and interconnecting linkage of a fluid pressure actuated brake mechanism.

A third object of the present invention is to provide an improved brake actuating mechanism mounting structure for brakes by which the brake actuating means is accurately-aligned relative to the brake shoes, and in which the motor and actuating linkage is so mounted that danger of injury thereto from road obstacles is substantially-eliminated.

A fourth object of the present invention is to provide an improved brake actuating mechanism mounting structure supported at the outer ends of the axle.

A fifth object of the present invention is to provide a brake actuator of simplified configuration and improved force transmission efficiency.

A sixth object of the present invention is to provide an improved brake controlling apparatus.

A seventh object of the present invention resides in the provision of a novel vehicle brake assembly including a bracket which is secured to the axle or housing and having an actuating mechanism which is carried by a member which is secured to the bracket.

An eighth object of the present invention is to provide an axle assembly for a brake mechanism actuator.

A ninth object of the present invention is to provide a brake actuating mechanism in a novel unitary assembly with a brake mechanism and an actuator.

A tenth object of the present invention is to provide a novel fluid brake actuator that may be located in a protected position.

An eleventh object of this invention is to provide a drum brake which is simpler than prior art brakes, but is no less effective than prior art brakes.

A twelfth object of this invention is to provide a single shoe drum brake which can operate without return springs.

A thirteenth object of the present invention is to prevent runaway trucks or at least to reduce their frequency of occurrence.

A fourteenth object of the present invention is to improve safety on the highways/roadways.

(ii) Statements of Invention

The present pneumatic braking system actuates the shoes with pneumatic cylinders, and is an improvement over those systems which need to be adjusted either manually or with the automatic slack adjusters.

By one embodiment of this invention, an improvement is provided in an actuator system for a brake system of the type including a brake and a source of compressed air which is connected to an air pot including a push rod for operating a transverse brake actuator bar between a brake applied position and a brake released position, the actuator system including an asymmetric operator member which is relatively-rotatably-attached to a non-rotatable wheel support, which is concentrically-disposed around the axle of the wheel. The asymmetric operator member includes an ear which is attached to the transverse brake actuator bar. A brake arm assembly which is operationally-connected to the asymmetric operator member comprises a pair of diametrically-opposed arcuate brake arms, each brake arm including an inner arcuate channel member. One end of the arcuate channel member terminates in a hollow cylindrical bushing, the other end of the channel member terminates in a pair of transversely-spaced-apart ears having aligned apertures therethrough. An inner and an outer anchor plate sandwiches the asymmetric operator member therebetween and are also relatively-rotatably-attached to the non-rotatable wheel support and are concentrically-disposed around the axle of the wheel. The pair of anchor plates are non-rotatably-secured to the asymmetric operator member. A first bifurcated link is rotatably-attached between the ears of a first channel member and the anchor plates, and a second bifurcated link is rotatably-attached between the ears of a second channel member and the anchor plates. A first hollow cylindrical bushing is rotatably-attached to the anchor plates opposite to the attachment of the second bifurcated link, and a second hollow cylindrical bushing is rotatably-attached to the anchor plates opposite to the attachment of the first bifurcated link. On activating the air pot, the push rod moves the transverse actuator bar to rotate the asymmetric operator member in a counter-clockwise direction, to urge the arcuate brake arm to move in a braking action radially-outwardly from an inactive position towards, and frictionally-engaging, radially-inwardly-facing brake pads, and on venting compressed air from the air pot, the push rod of the air pot moves the transverse actuator bar to rotate the asymmetric member in a clockwise direction, to urge the arcuate brake arms to move in a brake releasing action radially-inwardly to inactive positions away from, and out of frictional engagement with, the radially-inwardly-facing brake pads.

By a second embodiment of this invention, an improvement is provided in a brake system comprising a brake and a source of compressed air which is connected to an air pot including a push rod for operating a transverse brake actuator bar between a brake applied position and a brake released position, and a brake actuator system. The brake actuator system comprises an asymmetric operator member which is relatively-rotatably-attached to a non-rotatable wheel support, which is concentrically-disposed around the axle of the wheel. The asymmetric operator member includes an ear which is attached to the transverse brake actuator bar. A brake arm assembly which is operationally-connected to the asymmetric operator member comprises a pair of diametrically-opposed arcuate brake arms, each brake arm including an inner arcuate channel member. One end of the arcuate channel member terminates in a hollow cylindrical bushing, the other end of the channel member terminates in a pair of transversely-spaced-apart ears having aligned apertures therethrough. An inner and an outer anchor plate sandwiches the asymmetric operator member therebetween and are also relatively-rotatably-attached to the non-rotatable wheel support and are concentrically-disposed around the axle of the wheel. The pair of anchor plates are non-rotatably-secured to the asymmetric operator member. A first bifurcated link is rotatably-attached between the ears of a first channel member and the anchor plates, and a second bifurcated link is rotatably-attached between the ears of a second channel member and the anchor plates. A first hollow cylindrical bushing is rotatably-attached to the anchor plates opposite to the attachment of the second bifurcated link, and a second hollow cylindrical bushing is rotatably-attached to the anchor plates opposite to the attachment of the first bifurcated link. On activating the air pot, the push rod moves the transverse actuator bar to rotate the asymmetric operator member in a counterclockwise direction, to urge the arcuate brake arm to move in a braking action radially-outwardly from an inactive position towards, and frictionally-engaging, radially-inwardly-facing brake pads, and on venting compressed air from the air pot, the push rod of the air pot moves the transverse actuator bar to rotate the asymmetric member in a clockwise direction, to urge the arcuate brake arms to move in a brake releasing action radially-inwardly to inactive positions away from, and out of frictional engagement with, the radially-inwardly-facing brake pads.

By a third embodiment of this invention, an improvement is provided in the combination of a truck, truck-trailer or semi-trucks, a brake system including a brake and a source of compressed air which is connected to an air pot including a push rod for operating a transverse brake actuator bar between a brake applied position and a brake released position, and a brake actuator system. The brake actuator system comprises an asymmetric operator member which is relatively-rotatably-attached to a non-rotatable wheel support, which is concentrically-disposed around the axle of the wheel. The asymmetric operator member includes an ear which is attached to the transverse brake actuator bar. A brake arm assembly which is operationally-connected to the asymmetric operator member comprises a pair of diametrically-opposed arcuate brake arms, each brake arm including an inner arcuate channel member. One end of the arcuate channel member terminates in a hollow cylindrical bushing, the other end of the channel member terminates in a pair of transversely-spaced-apart ears having aligned apertures therethrough. An inner and an outer anchor plate sandwiches the asymmetric operator member therebetween and are also relatively-rotatably-attached to the non-rotatable wheel support and are concentrically-disposed around the axle of the wheel. The pair of anchor plates are non-rotatably-secured to the asymmetric operator member. A first bifurcated link is rotatably-attached between the ears of a first channel member and the anchor plates, and a second bifurcated link is rotatably-attached between the ears of a second channel member and the anchor plates. A first hollow cylindrical bushing is rotatably-attached to the anchor plates opposite to the attachment of the second bifurcated link, and a second hollow cylindrical bushing is rotatably-attached to the anchor plates opposite to the attachment of the first bifurcated link. On activating the air pot, the push rod moves the transverse actuator bar to rotate the asymmetric operator member in a counterclockwise direction, to urge the arcuate brake arm to move in a braking action radially-outwardly from an inactive position towards, and frictionally-engaging, radially-inwardly-facing brake pads, and on venting compressed air from the air pot, the push rod of the air pot moves the transverse actuator bar to rotate the asymmetric member in a clockwise direction, to urge the arcuate brake arms to move in a brake releasing action radially-inwardly to inactive positions away from, and out of frictional engagement with, the radially-inwardly-facing brake pads.

By a fourth embodiment of this invention, the combination is provided of a brake system comprising a brake and a source of compressed air which is connected to an air pot including a push rod for moving a transverse brake actuator bar between a brake applied position and a brake released position, the push rod operating the transverse brake actuator bar, and an actuator system comprising an asymmetric operator member which is relatively-rotatably-attached to a non-rotatable wheel support, and is concentrically-disposed around an axle of a wheel, the asymmetric operator member including an ear which is attached to the transverse brake actuator bar, a brake arm assembly comprising a pair of diametrically-opposed arcuate brake arms, each the brake arm including an inner arcuate channel member, one end of the arcuate channel member terminating in a hollow cylindrical bushing, the other end of the channel member terminating in a pair of transversely-spaced-apart ears having aligned apertures therethrough, an inner anchor plate and an outer anchor plate sandwiching the asymmetric operator member therebetween and also being relatively-rotatably-attached to the non-rotatable wheel support concentrically-disposed around the axle of the wheel, the anchor plates being non-rotatably-secured to the asymmetric operator member, a first bifurcated link which is rotatably-attached between the ears of a first channel member and the anchor plates, a second bifurcated link which is rotatably-attached between the ears of a second channel member and the anchor plates, a first hollow cylindrical bushing which is rotatably-attached to the anchor plates opposite to the attachment of the second bifurcated link, and a second hollow cylindrical bushing which is rotatably-attached to the anchor plates opposite to the attachment of the first bifurcated link, whereby on activating the air pot, the push rod moves the transverse actuator bar to rotate the asymmetric operator member in a counter-clockwise direction, to urge the arcuate brake arm to move in a braking action radially-outwardly from an inactive position towards, and fictionally-engaging, radially-inwardly-facing brake pads, and on venting compressed air from the air pot, the push rod in the air pot moves the transverse actuator bar to rotate the asymmetric operator member in a clockwise direction, to urge the arcuate brake arms to move in a brake releasing action radially-inwardly to inactive positions away from, and out of frictional engagement with, the radially-inwardly-facing brake pads.

By a fifth embodiment of the invention, the combination is provided of a truck, truck-trailer or semi-truck, the truck-trailer or semi-truck having a plurality of axles, each axle having a pneumatically-operated drum brake assembly at each end thereof, and an axle casing housing the axle, a brake system comprising a brake and a source of compressed air which is connected to an air pot including a push rod for moving a transverse brake actuator bar between a brake applied position and a brake released position, the push rod operating the transverse brake actuator bar, and an actuator system comprising an asymmetric operator member which is relatively-rotatably-attached to a non-rotatable wheel support, and is concentrically-disposed around an axle of a wheel, the asymmetric operator member including an ear which is attached to the transverse brake actuator bar, a brake arm assembly comprising a pair of diametrically-opposed arcuate brake arms, each the brake arm including an inner arcuate channel member, one end of the arcuate channel member terminating in a hollow cylindrical bushing, the other end of the channel member terminating in a pair of transversely-spaced-apart ears having aligned apertures therethrough, an inner anchor plate and an outer anchor plate sandwiching the asymmetric operator member therebetween and also being relatively-rotatably-attached to the non-rotatable wheel support concentrically-disposed around the axle of the wheel, the anchor plates being non-rotatably-secured to the asymmetric operator member, a first bifurcated link which is rotatably-attached between the ears of a first channel member and the anchor plates, a second bifurcated link which is rotatably-attached between the ears of a second channel member and the anchor plates, a first hollow cylindrical bushing which is rotatably-attached to the anchor plates opposite to the attachment of the second bifurcated link, and a second hollow cylindrical bushing which is rotatably-attached to the anchor plates opposite to the attachment of the first bifurcated link, whereby on activating the air pot, the push rod moves the transverse actuator bar to rotate the asymmetric operator member in a counter-clockwise direction, to urge the arcuate brake arm to move in a braking action radially-outwardly from an inactive position towards, and fictionally-engaging, radially-inwardly-facing brake pads, and on venting compressed air from the air pot, the push rod in the air pot moves the transverse actuator bar to rotate the asymmetric operator member in a clockwise direction, to urge the arcuate brake arms to move in a brake releasing action radially-inwardly to inactive positions away from, and out of frictional engagement with, the radially-inwardly-facing brake pads.

(iii) Other Features of this Invention

By one feature of the first embodiment of this invention, the push rod includes vertical teeth thereon acted on by a release pawl, whereby accidental release of air pressure other than at the air pot causes the pawl to hold the push rod down, and thereby to maintain a braking action.

In a second feature of the first embodiment of this invention, and/or the above feature thereof, the inner anchor plate includes a pair of diametrically-spaced-apart, outer axle rods within which the hollow cylindrical bushings are concentrically-rotatably-disposed.

By a third feature of the first embodiment of this invention and/or the above features thereof, the wheel includes a cylindrical support which comprises a radially-inwardly facing surface extending substantially-continuously around the rotational axis of the wheel, so that the brake lining structure which comprises brake pads, are rigidly secured to the cylindrical support. By one specific feature thereof, the brake pads are detachably, but securely, mounted on the cylindrical support, with the brake lining structure facing radially-inwards towards the rotational axis of the wheel and the arcuate brake arms.

By a fourth feature of the first embodiment of this invention and/or the above features thereof, the wheel includes a cylindrical support which comprises a radially-inwardly-directed cylindrical support surface to which a brake lining carrier which has an outer circumferential surface which is complementary to the cylindrical support surface is attached, and includes securing members for securing the brake lining carrier to the cylindrical support surface. By one specific feature thereof, the securing members comprise a plurality of screws which are spaced apart angularly around the rotational axis of the wheel and which extend radially through respective aligned holes in the brake lining carrier and in the cylindrical support. By a second specific feature thereof, the support surface and the circumferential surface are each cylindrical and are complementary to one another.

By one feature of the fourth embodiment of this invention, the air pot includes a first diaphragm for applying pressure to the push rod, the diaphragm being supplied with pressurized air from a service reservoir.

By a second feature of the fourth embodiment of this invention, and/or the above feature thereof, the air pot includes a second diaphragm for applying pressure to the push rod, the second diaphragm being operated by a spring within the air pot.

By one feature of the fifth embodiment of this invention, the combination includes an air chamber mount which is secured to the axle casing adjacent to each end of the axle casing, and an air chamber which is mounted on the air chamber mount, the air chamber being connected to a source of compressed air.

By a second feature of the fifth embodiment of this invention, and/or the above feature thereof, the combination includes a transverse angle bar which is secured to the axle casing, and also includes a release pawl which is secured to the transverse angle bar, the push rod including vertical teeth thereon cooperating with the release pawl, whereby accidental release of air pressure other than at the air pot causes the release pawl to hold the push rod down, and thereby to maintain a braking action.

By a third feature of the fifth embodiment of this invention, and/or the above features thereof, the push rod is operatively-associated with a transverse actuator bar which is operatively-connected to the asymmetric member, whereby, when the push rod moves downwardly the transverse actuator bar is caused to rotate the asymmetric operator member in a counter-clockwise direction, to cause a braking action, and when the push rod moves upwardly the transverse actuator bar is caused to rotate the asymmetric member in a clockwise direction, to cause a brake releasing action.

By a fourth feature of this fifth embodiment of this invention, and/or the above features thereof, the combination includes an air chamber mount which is secured to the axle casing adjacent to each end of the axle casing, and an air chamber which is mounted on the air chamber mount, the air chamber being connected to a source of compressed air, and also including a transverse angle bar which is secured to the axle casing, and further including a release pawl which is secured to the transverse angle bar, the push rod including vertical teeth thereon cooperating with the release pawl, whereby accidental release of air pressure other than at the air pot causes the release pawl to hold the push rod down, and thereby to maintain a braking action.

By a fifth feature of this fifth embodiment of this invention, and/or the above features thereof, the combination includes an air chamber mount which is secured to the axle casing adjacent to each end of the axle casing, and an air chamber which is mounted on the air chamber mount, the air chamber being connected to a source of compressed air, the push rod being operatively-associated with a transverse actuator bar which is operatively-connected to the asymmetric member, whereby, when the push rod moves downwardly the transverse actuator bar is caused to rotate the asymmetric operator member in a counter-clockwise direction, to cause a braking action, and when the push rod moves upwardly the transverse actuator bar is caused to rotate the asymmetric member in a clockwise direction, to cause a brake releasing action.

By a sixth feature of the fifth embodiment of this invention, and/or the above features thereof, the combination includes an air chamber mount which is secured to the axle casing adjacent to each end of the axle casing, and an air chamber which is mounted on the air chamber mount, the air chamber being connected to a source of compressed air, and including a transverse angle bar secured to the axle casing, and also including a release pawl which is secured to the transverse angle bar, the push rod including vertical teeth thereon cooperating with the release pawl, whereby accidental release of air pressure other than at the air pot causes the release pawl to hold the push rod down, and thereby to maintain a braking action, the push rod being operatively-associated with a transverse actuator bar which is operatively-connected to the asymmetric member, whereby, when the push rod moves downwardly the transverse actuator bar is caused to rotate the asymmetric operator member in a counter-clockwise direction, to cause a braking action, and when the push rod moves upwardly the transverse actuator bar is caused to rotate the asymmetric member in a clockwise direction, to cause a brake releasing action.

In a wheel which may be used in association with the brake systems according to embodiments of the present invention, the brake lining structure may be applied directly to the support means of the wheel. This support means may comprise an inwardly facing cylindrical surface to which the lining structure is directly mounted. Alternatively, the wheel may have a support means for securing a brake lining assembly thereto, the brake lining assembly comprising the brake lining structure which is secured to a surrounding brake lining carrier. The brake lining assembly is then mounted upon the wheel by cooperation between the brake lining carrier and the support means. In this arrangement, the carrier is detachably secured in position with the brake lining structure facing radially-inwards towards the rotational axis of the wheel.

BRIEF DESCRIPTION OF THE DRAWINGS

In the accompanying drawings,

FIGS. 4 to 8 are views of emergency or parking brakes embodying features of the invention, which is disclosed and claimed in the above-identified U.S. Pat. No. 5,865,277 being provided for exemplification of the prior art, and in which the wheel and tire are not being shown, for clarity, in which:

FIG. 4 is a side elevational view showing one embodiment of a parking brake incorporated into a wheel assembly;

FIG. 5 is a side elevational view similar to FIG. 4 showing a second embodiment of a parking brake incorporated into a wheel assembly;

FIG. 6 is a side elevational view similar to FIG. 4 showing a third embodiment of a parking brake incorporated into a wheel assembly;

FIG. 7 is a side elevational view similar to FIG. 4, showing a fourth embodiment of a parking brake incorporated into a wheel assembly; and FIG. 8 is a side elevational view similar to FIG. 4, showing a fifth embodiment of a parking brake incorporated into a wheel assembly;

Figure 1:
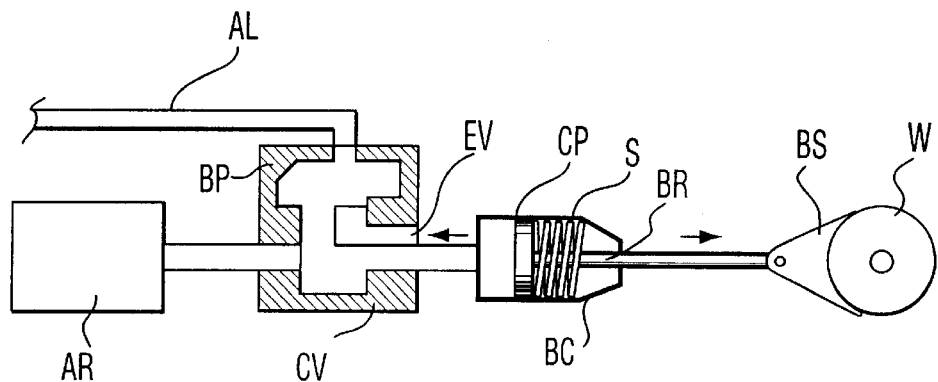
FIG. 1 and FIG. 2 are schematic views showing how a typical air brake would operate.
Figure 2:
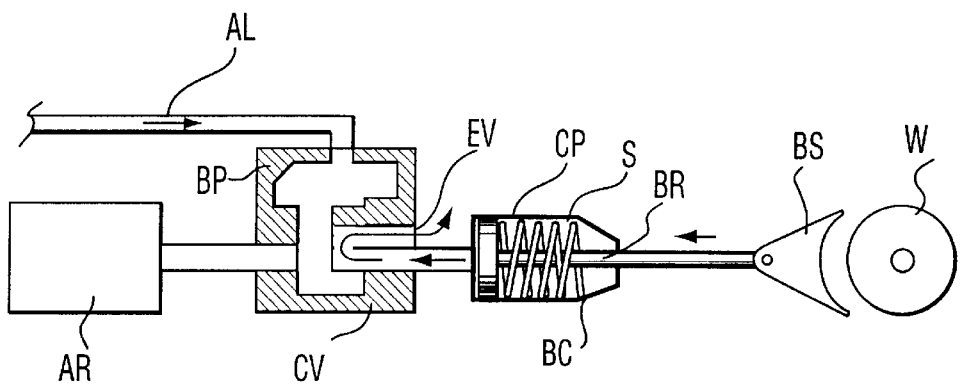

DESCRIPTION OF PRIOR ART EMBODIMENTS (i) Description of FIG. 1 and FIG. 2

Before describing embodiments of this invention, a brief description of a typical air brake and its operation will be given. As seen in FIG. 1 and FIG. 2, a typical air brake includes an auxiliary reservoir (AR) containing compressed air which is connected to a central valve including an operable/closable compressed air by-pass (BP) and operable/closable exhaust vent (EX). The central valve (CV) is connected to a spring-loaded, brake cylinder (BC) containing a cylinder piston (CP), which is connected to a brake rod (BR) and operating against spring (S). The brake rod (BR) is connected to a brake shoe (BS) which is urged to engage the wheel (W). The central valve (CV) is connected to a principal source of compressed air by a compressed air line (AL).

FIG. 1 shows the brake "applied" position, while FIG. 2 shows the brake "released" position.

As seen in FIG. 1 and FIG. 2, the operation of these conventional air brakes is as follows. To apply the brakes, the air pressure is lowered in the compressed air line (AL) as shown by the reverse arrows in compressed air line (AL) leading from the central valve (CV). This releases compressed air from within the auxiliary reservoir (AR) to pass through the central valve, since the compressed air by-pas (BP) is open and the exhaust vent (EV) is closed, air enters the brake cylinder (BC). The compressed air acts on the exposed face of the cylinder piston (CP) urging it to the right, against the reaction of the spring (S). This urges the brake rod (BR) to the right and causes the brake shoe (BS) to contact the wheel (W), making the brake shoe (BS) grip the wheel (W).

To release the brakes, the air pressure is reversed in the air line (AL) leading to the central valve (CV) as shown by the arrows in the air line (AL). Since the exhaust vent (EV) is open and the compressed air by-pass (BP) is closed the compressed air reverses in the central valve (CV) into the auxiliary reservoir (AR). The compressed air in the brake cylinder (BC) is released and passes from the bake cylinder (BC) into the central valve (CV) and exhaust through the exhaust vent (EV). The spring (S) urges the brake rod (BR) to the left and freeing the brake shoe (BS) from the grip on the wheel (W). The air pressure builds-up again in the auxiliary reservoir (AR).

Figure 3:
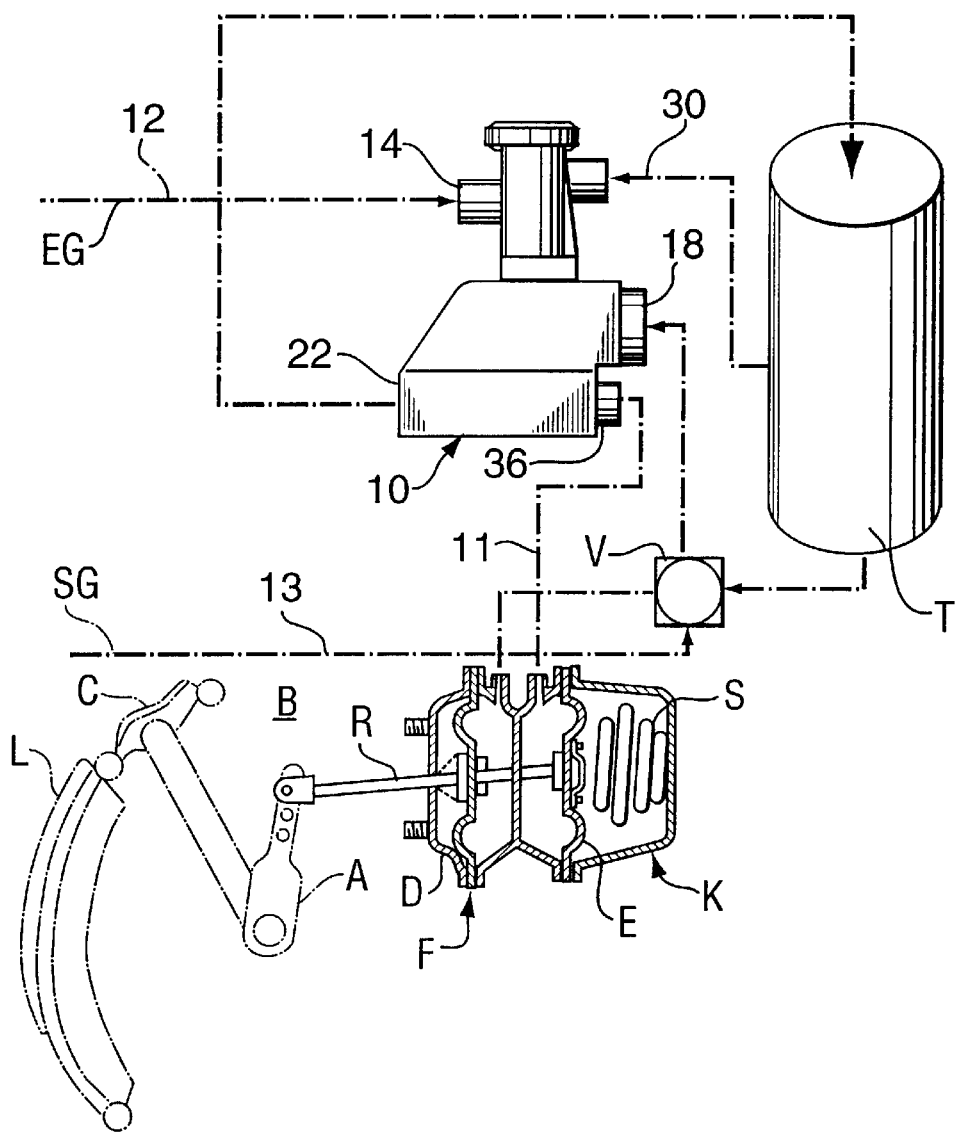
FIG. 3 is schematic illustrational view of a conventional emergency brake control valve assembly of the prior art with an emergency supply line, a service supply line, a combination service and emergency spring brake and a service supply reservoir.

(ii) Description of FIG. 3

Before describing embodiments of this invention, a brief description of a typical air brake of the prior art will be given. FIG. 3 shows a schematic of a brake assembly "B". The assembly includes a brake lining "L" which is operated by an S-CAM "C" through a slack adjuster "A". The brake is applied by a push rod "R" which is driven either by the diaphragm "D" of a service brake "F" or by the spring "S" of a spring brake "K". The spring brake "K" is more generally identified as the parking/emergency brake. The spring brake "K" is normally held in the "released" position by air pressure which is applied against the diaphragm "E", which pressure is received from the emergency brake control valve assembly through a supply line. Pressure to a control valve assembly is provided through an emergency supply line from a gladhand "EG" which is connected to an air compressor for supplying pressure to the brake system. The brake assembly "B" is normally controlled by the service brake "F" by air pressure acting upon the diaphragm "D". The diaphragm is activated by compressed air which is received through a control line extending from a service gladhand which is also connected to the compressor supply source and which extends through a relay valve "V". Pressure to the service brakes "F" is also supplied through a service reservoir "T" which is pressurized by the compressed air passing through the emergency supply line 12 and the control valve assembly 10.

While any brake structure may be used with the emergency brake structure of this invention, e.g., conventional brake lining/brake shoes structures and disc brake structure, one very useful brake structure is that described and claimed in applicant's U.S. Pat. No. 5,865,277, patented Feb. 2, 1999, the entire contents of which are incorporated herein by reference. FIGS. 4 to 8 describe the structure and operation of the emergency brakes which are disclosed and claimed in that patent.

Figure 4:
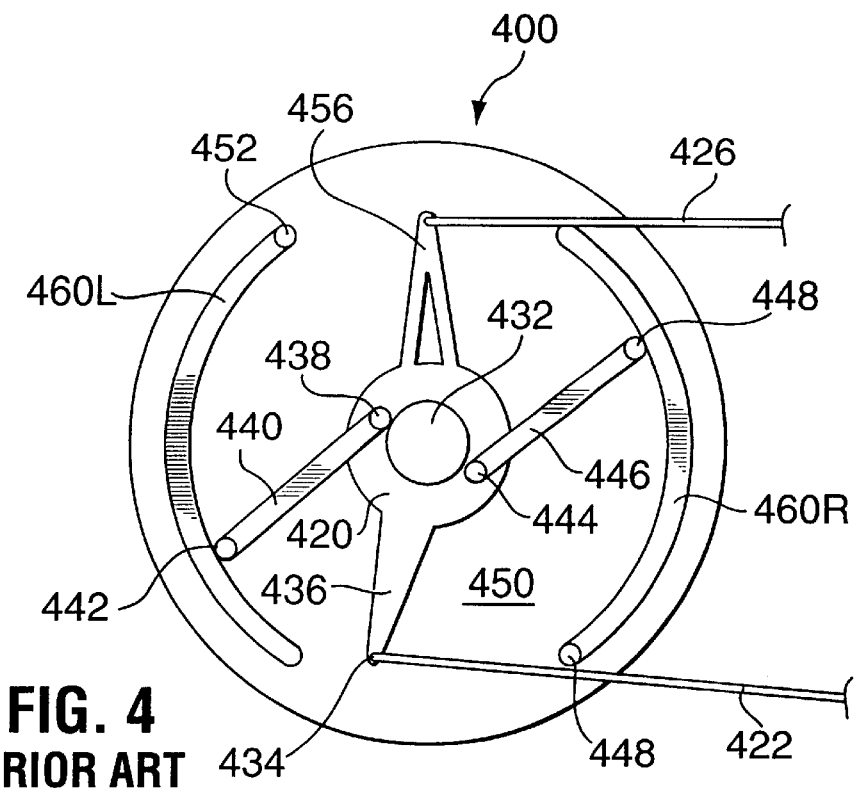

(iii) Description of FIG. 4

As shown in FIG. 4, the emergency or parking brake 400 includes a backing plate 450 supporting both an actuation disc 420, and an emergency brake mounting bracket (unnumbered) which are freely-rotatably-mounted around the axis of rotation of the wheel, at axle 432. The actuator disc 420 is attached at one radial position to a push rod 422 at connection point 434 on first lower arm 436 of actuator disc 420. The actuator disc 420 is operatively-connected at pivot point 438 by downwardly-obliquely-oriented link 440 to one (left-hand) arcuate brake arm 460L at pivot point 442, and at pivot point 444 by upwardly-obliquely-oriented link 446 to the other arcuate brake arm 460R at pivot point 448. One (left-hand) arcuate brake arm 460L is pivotally-connected to backing plate 450 at upper pivot point 452, while the other (right-hand) arcuate brake arm 460L is pivotally-connected at diametrically-opposed lower pivot point 448. While, as shown in FIG. 4, the (left-hand) arcuate brake arm 460L has an upper pivot point and the (right-hand) brake arm 460R has a lower pivot point, these points may be reversed, with the (left-hand) arcuate brake arm 460L having a lower pivot point, and the (right-hand) arcuate brake arm 460R having an upper pivot point.

The actuator disc 420 includes an upper arm 456 which is connected to a push rod 426.

FIG. 4 shows the emergency or parking brake 400 in its non-engaged (released) orientation with the operating links 440, 446 permitting the arcuate brake arms 460L, 460R to lie in their released positions.

17

Figure 5:
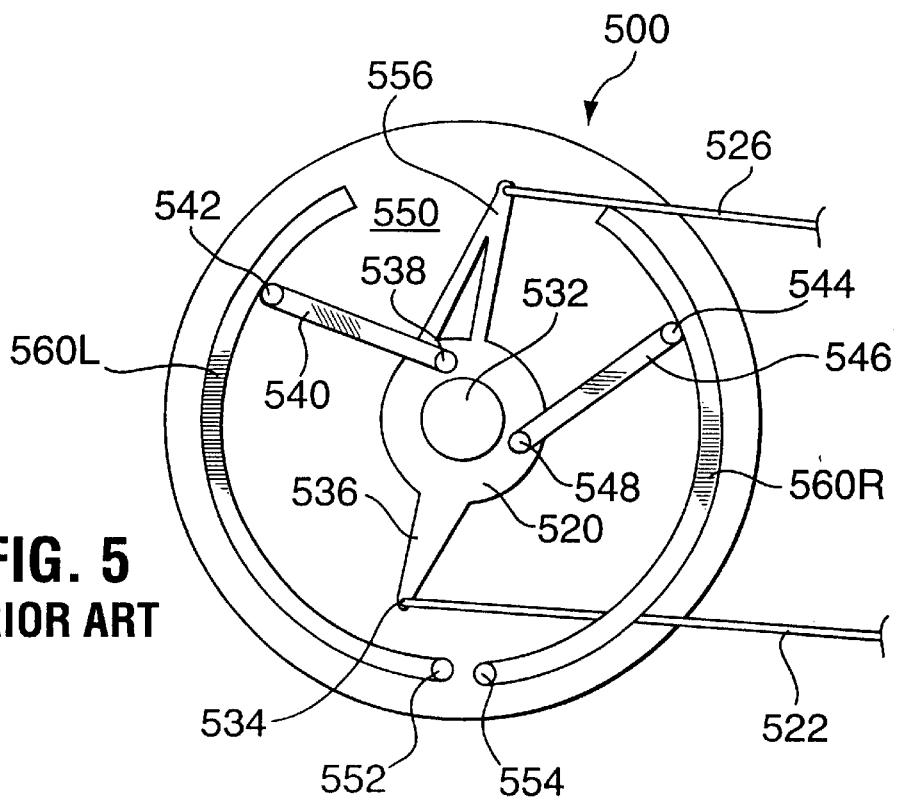

(iv) Description of FIG. 5

As shown in FIG. 5, the emergency or parking brake 500 includes a backing plate 550 supporting both an actuation disc (unnumbered) and an emergency brake mounting bracket, which is freely-rotatably-mounted around the axis of rotation of the wheel, at axle 532. The actuator disc 520 is attached at one radial position to a push rod 522 at connection point 534 on first lower arm 536 of actuator disc 520. The actuator disc 520 is operatively-connected at pivot point 538 by upwardly-obliquely-oriented link 540 to the (left-hand) arcuate brake arm 560L at pivot point 542, and at pivot point 544 by upwardly-obliquely-oriented link 546 to the (right-hand) side arcuate brake arm 560R at pivot point 548. One (left-hand) arcuate brake arm 560L is pivotally-connected to backing plate at lower pivot point 552, while the other (right-hand) arcuate brake arm 560R is pivotally-connected at adjacent lower pivot point 554. While, as shown in FIG. 5, the (left-hand) arcuate brake arm 560L has a lower pivot point and the (right-hand) brake arm 560R has a lower pivot point, these points may be reversed, with the (left-hand) arcuate brake arm 560L having an upper pivot point, and the (right-hand) arcuate brake arm 560R also having an upper pivot point. The actuator disc 520 includes an upper arm 556 which is connected to a push rod 526.

FIG. 5 shows the emergency or parking brake 500 in its non-engaged (released) orientation with the operating links 540, 546, permitting the arcuate brake arms 560L, 560R, to lie in their released positions.

Figure 6:
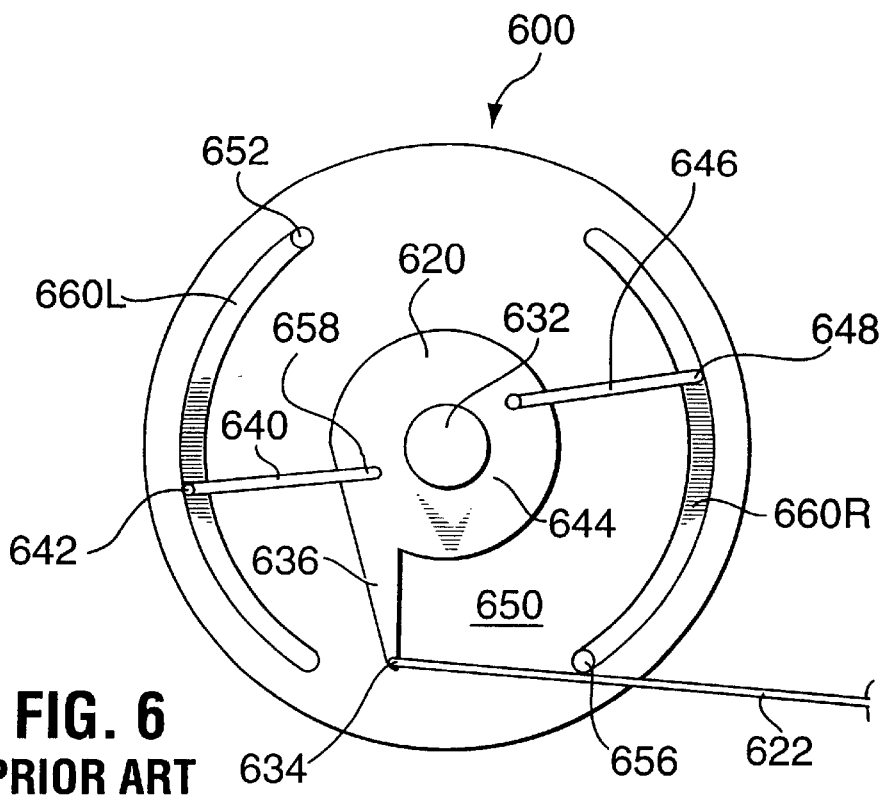

(v) Description of FIG. 6

As shown in FIG. 6, the emergency or parking brake 600 includes a backing plate 650 supporting both an actuation disc 620 and an emergency brake mounting bracket (unnumbered) which is freely-rotatably-mounted around the axis of rotation of the wheel, at axle 632. The actuator disc 620 is attached at one radial position to a lower push rod 622 at connection point 634 on lower arm 636 of actuator disc 620. The actuator disc 620 is operatively-connected at pivot point 658 by downwardly-obliquely-oriented link 640 to the (left-hand) arcuate brake arm 660L at pivot point 642, and at pivot point 644 by upwardly-obliquely-oriented link 646 to the (right-hand) arcuate brake arm 660R at pivot point 648. The (left-hand) arcuate brake arm 660L is pivotally-connected to backing plate 672 at upper pivot point 652, while the (right-hand) other arcuate brake arm 660R is pivotally-connected at diametrically-opposed lower pivot point 656. While, as shown in FIG. 6, the (left-hand) arcuate brake arm 660L has an upper pivot point and the (right-hand) brake arm 660R has a lower pivot point, these points may be reversed, with the (left-hand) arcuate brake arm 660L having a lower pivot point, and the (right-hand) arcuate brake arm 660R having an upper pivot point. While FIG. 6 shows the arm 636 to be a lower arm, it is equally possible for the arm 636 to be an upper arm.

FIG. 6 shows the emergency or parking brake 600 in its non-engaged (released) orientation with the operating links 640, 646 permitting the arcuate brake arms 660 to lie in their released positions.

Figure 7:
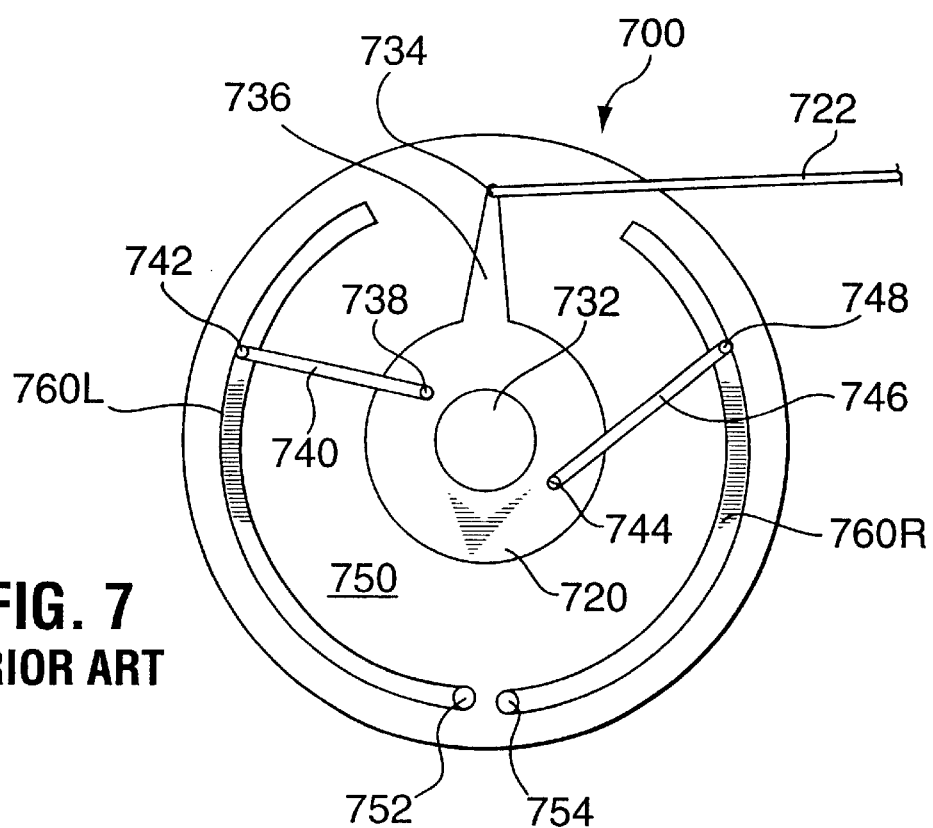

(vi) Description of FIG. 7

As shown in FIG. 7, the emergency or parking brake 700 includes a backing plate 750 supporting both an actuation disc 720 and an emergency brake mounting bracket (unnumbered) which is freely-rotatably-mounted around the axis of rotation of the wheel, at axle 732. The actuator disc 720 is attached at one radial position to an upper push rod 722 at connection point 734 on arm 736 of actuator disc 720.

18

The actuator disc 720 is operatively-connected at pivot point 738 by upwardly-obliquely-oriented link 740 to the (left-hand) arcuate brake arm 760L at pivot point 742, and at pivot point 744 by upwardly-obliquely-oriented link 746 to the (right-hand) arcuate brake arm 760R at pivot point 748. The (left-hand) arcuate brake arm 760L is pivotally-connected to backing plate 750 at lower pivot point 752, while the (right-hand) arcuate brake arm 760R is pivotally-connected at adjacent lower pivot point 754. While, as shown in FIG. 7, the (left-hand) arcuate brake arm 760L has a lower pivot point and the (right-hand) brake arm 760R has a lower pivot point, these points may be reversed, with the (left-hand) arcuate brake arm 760L having an upper pivot point, and the (right-hand) arcuate brake arm 760R also having an upper pivot point. While FIG. 7 shows the arm 736 to be an upper arm, it is equally-possible for the arm 736 to be a lower arm.

FIG. 7 shows the emergency or parking brake 720 in its non-engaged (released) orientation with the operating links 740, 746, permitting the arcuate brake arms 760L, 760R to lie in their released positions.

Figure 8:
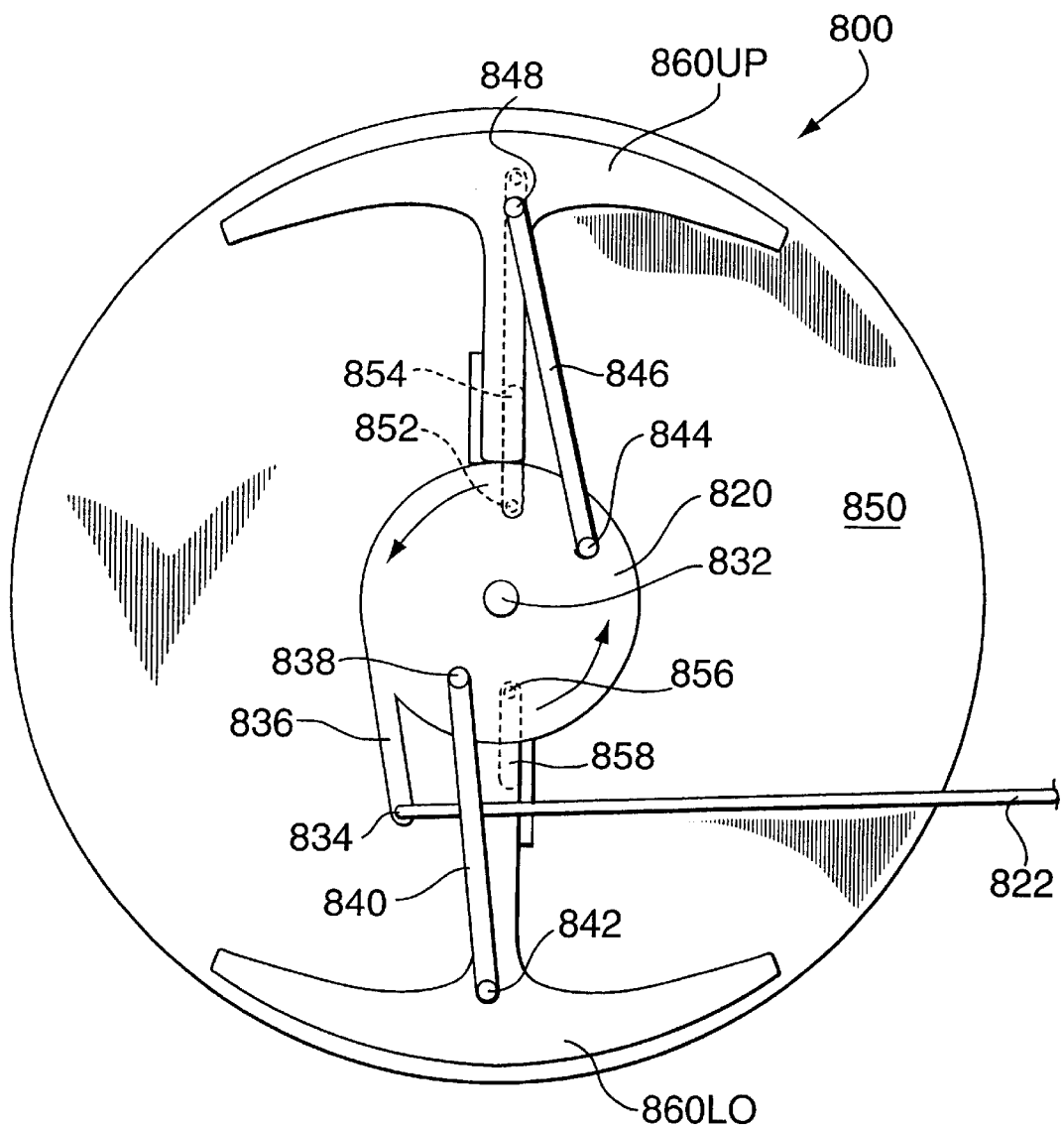
Figure 9:
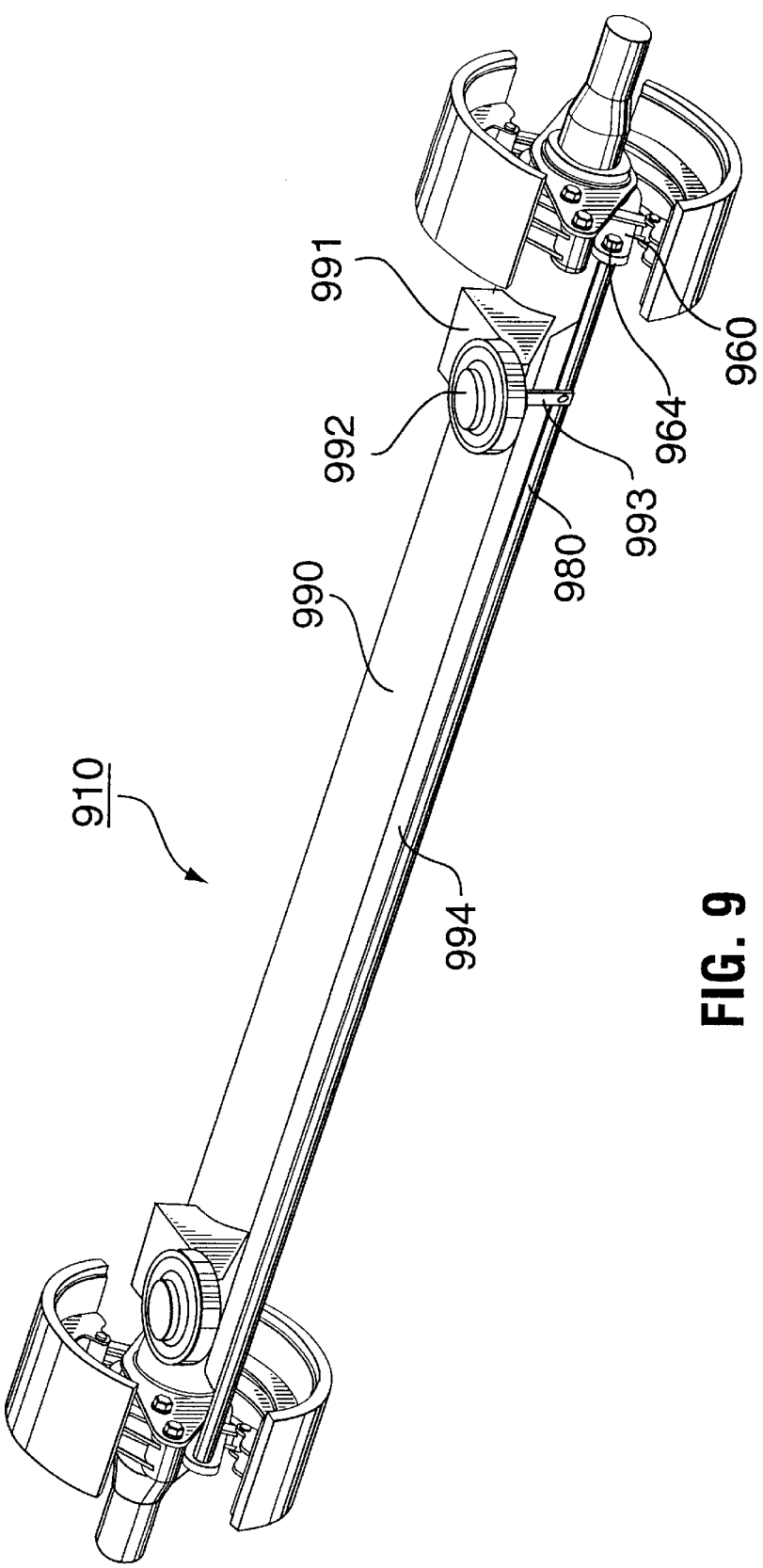
FIG. 9 is a perspective view, partially-broken away, showing an axle and wheel equipped with an air brake system according to one embodiment of this invention, with the wheel and tire not being shown, for clarity.
Figure 10:
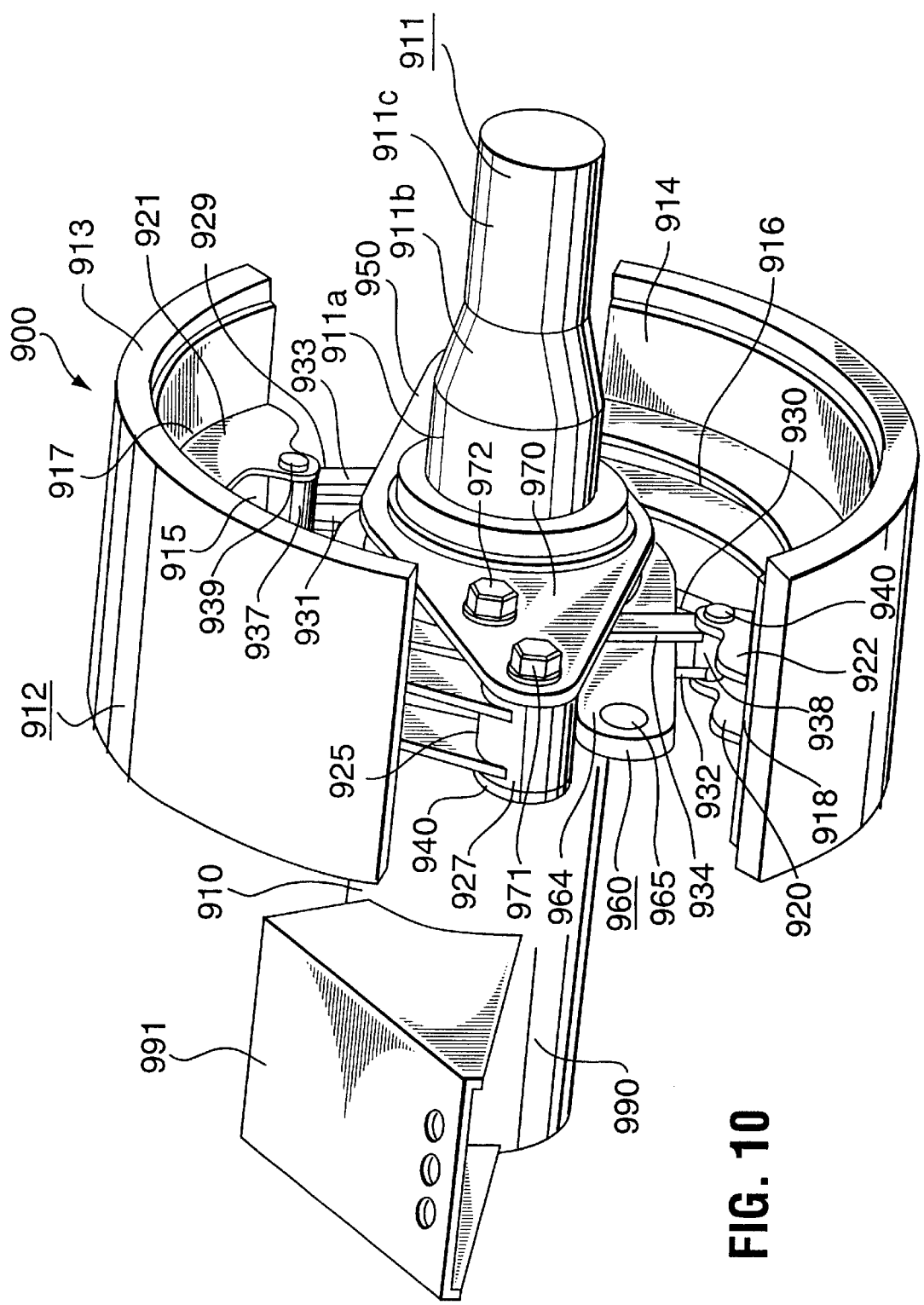
FIG. 10 is an enlarged view of a portion of FIG. 9, showing the brake arms and actuating mechanism.
Figure 11:
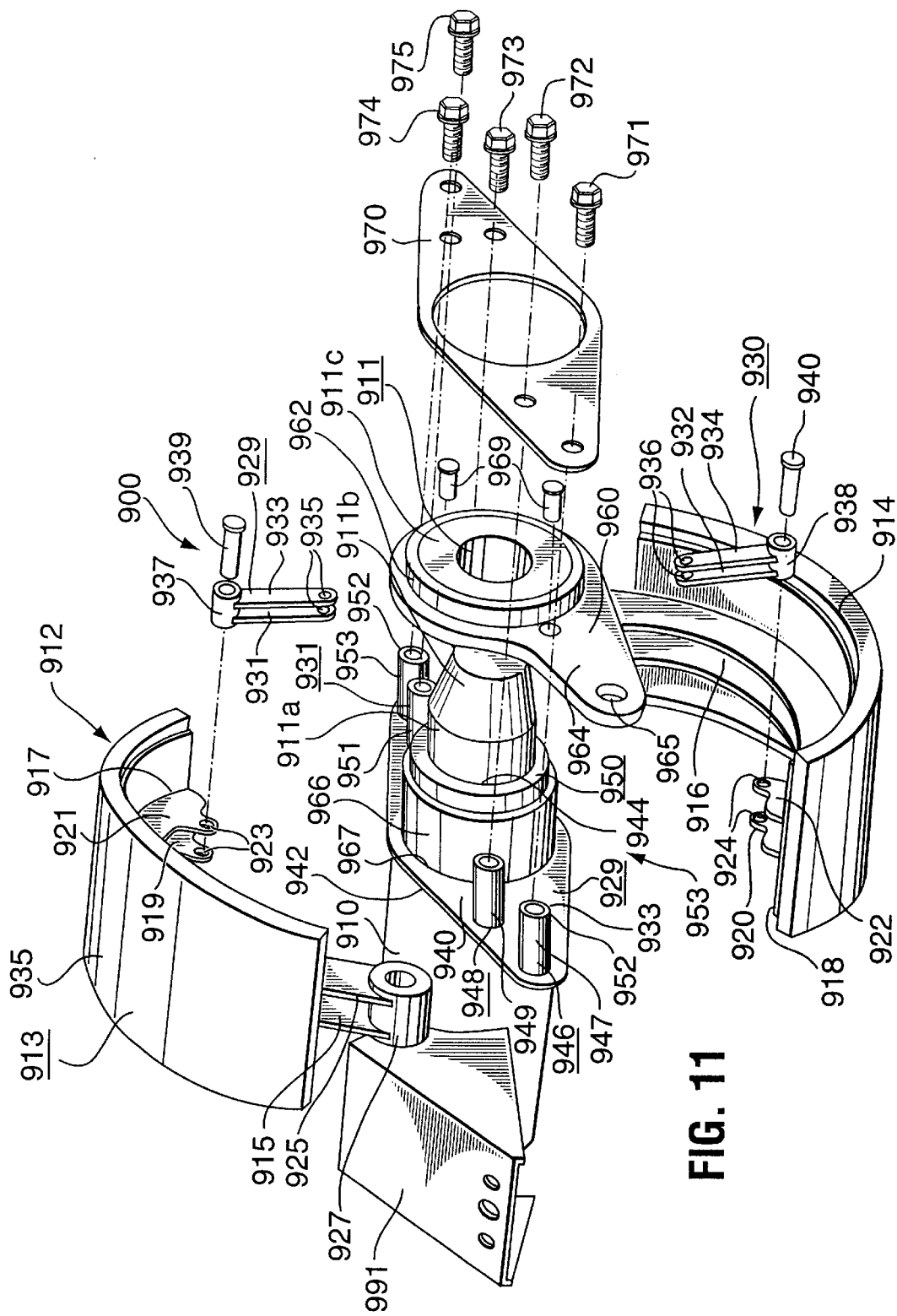
FIG. 11 is an exploded view of the embodiment shown in FIG. 13.
Figure 12:
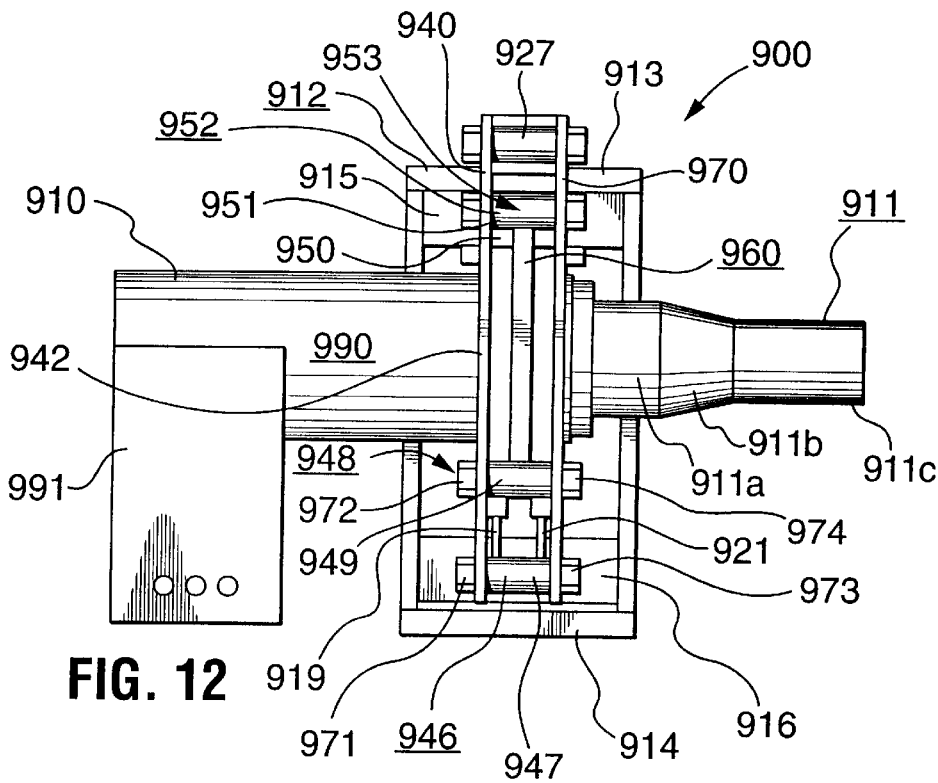
FIG. 12 is a side elevational view, partly in section, showing the brake axis and the actuating mechanism.
Figure 13:
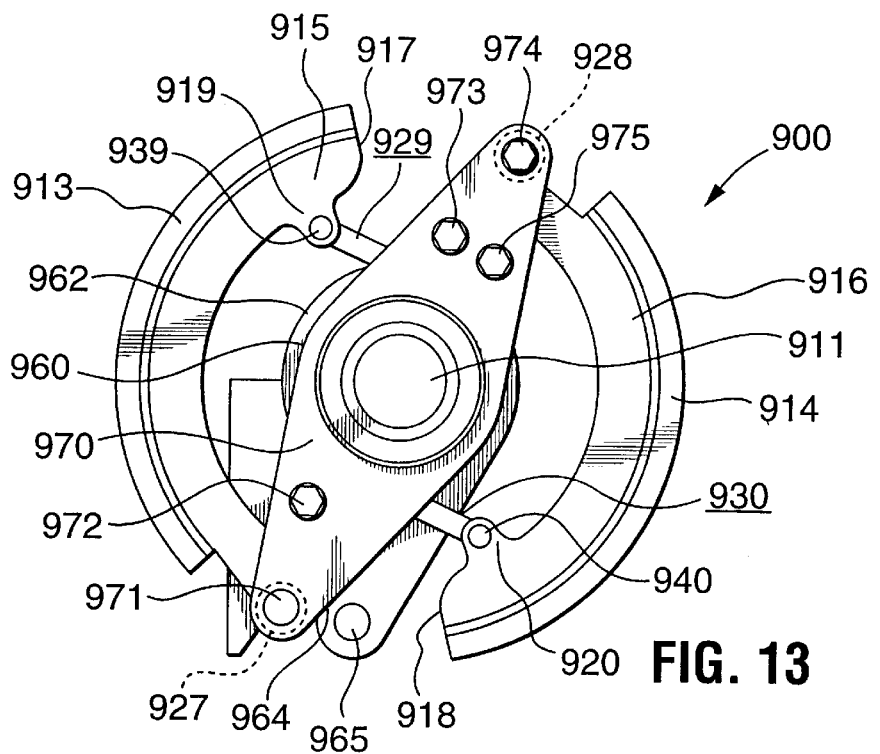
FIG. 13 is a side elevational view, showing the brake axis and the actuating mechanism.
Figure 14:
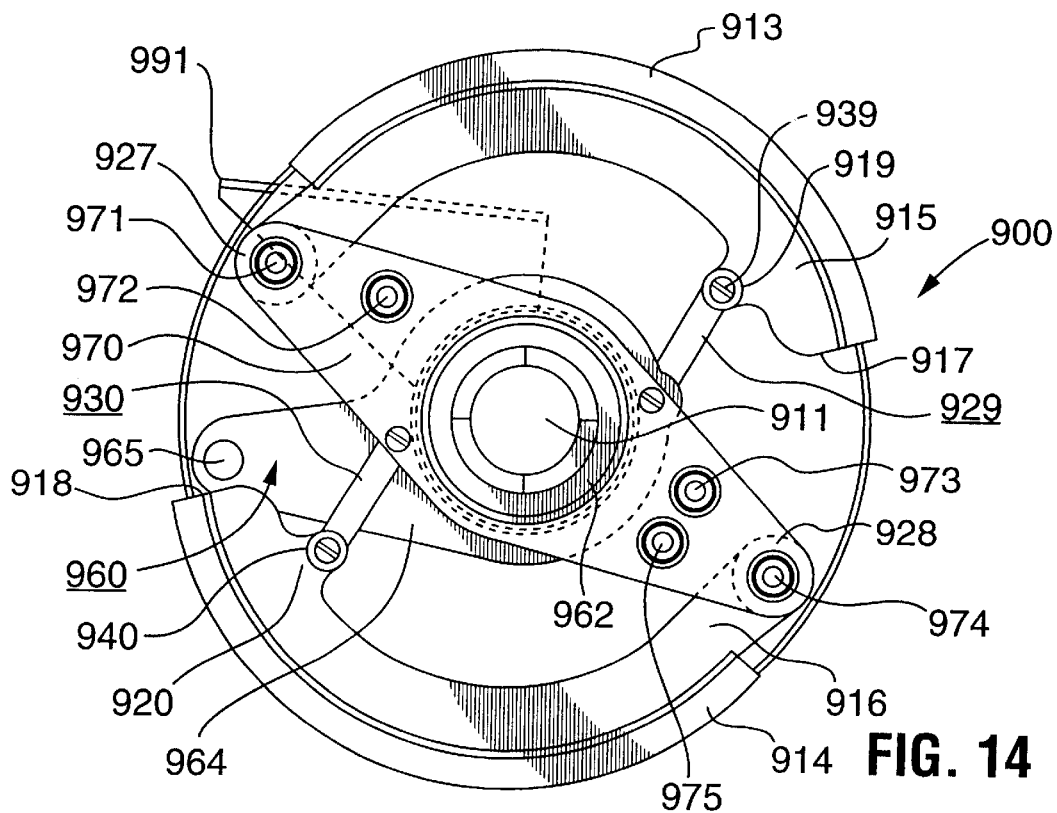
FIGS. 14 and 15 are views of the braking system of an embodiment of this invention, showing the brake shoes in an "open" and "closed" orientation, respectively.
Figure 15:
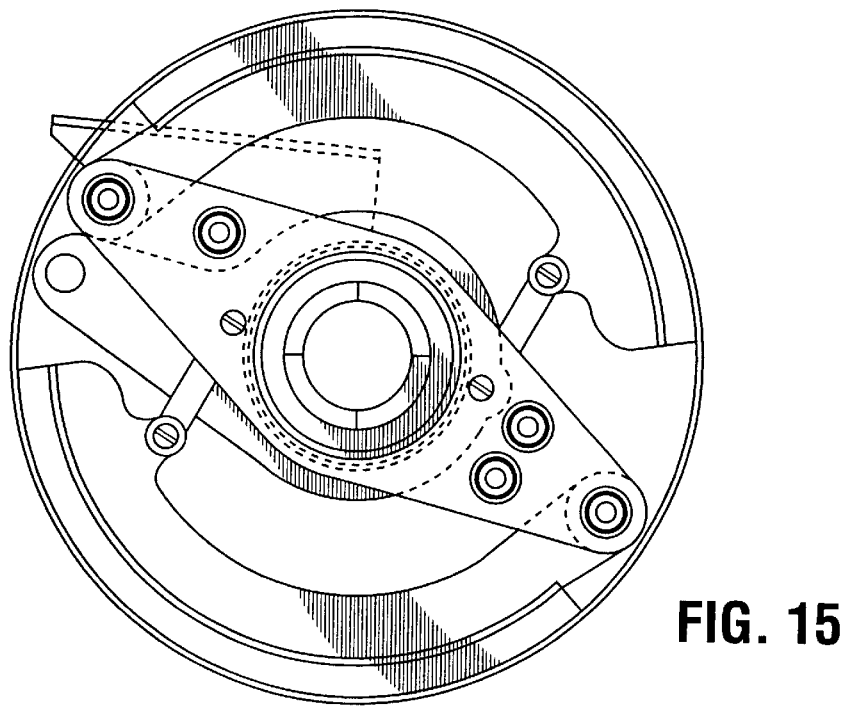

(vii) Description of FIG. 8

As shown in FIG. 8, the emergency or parking brake 800 includes a backing plate 850 supporting both an actuation disc 820 and an emergency brake mounting bracket (unnumbered) which is freely-rotatably-mounted around the axis of rotation of the wheel, at axle 832. The actuator disc 820 is attached at one radial position to push rod 822 at connection point 834 on arm 836 of actuator disc 820. The actuator disc 820 is operatively-connected at pivot point 838 by downwardly-obliquely-oriented link 840 to lower arcuate brake arm 860LO at pivot point 842, and at pivot point 844 by upwardly-obliquely-oriented link 846 to the upper arcuate brake arm 860UP at pivot point 848. The upper arcuate brake arm 860UP is slidably-connected to the mounting bracket by pin 852 in channel 854. The lower arcuate brake arm 860LO is similarly-slidably-connected to the mounting bracket by pin 856 in channel 858.

FIG. 8 shows the emergency or parking brake 800 in its non-engaged (released) orientation with the operating links 840, 846 permitting the arcuate brake arms 860LO, 860UP to lie in their released positions.

Figure 16:
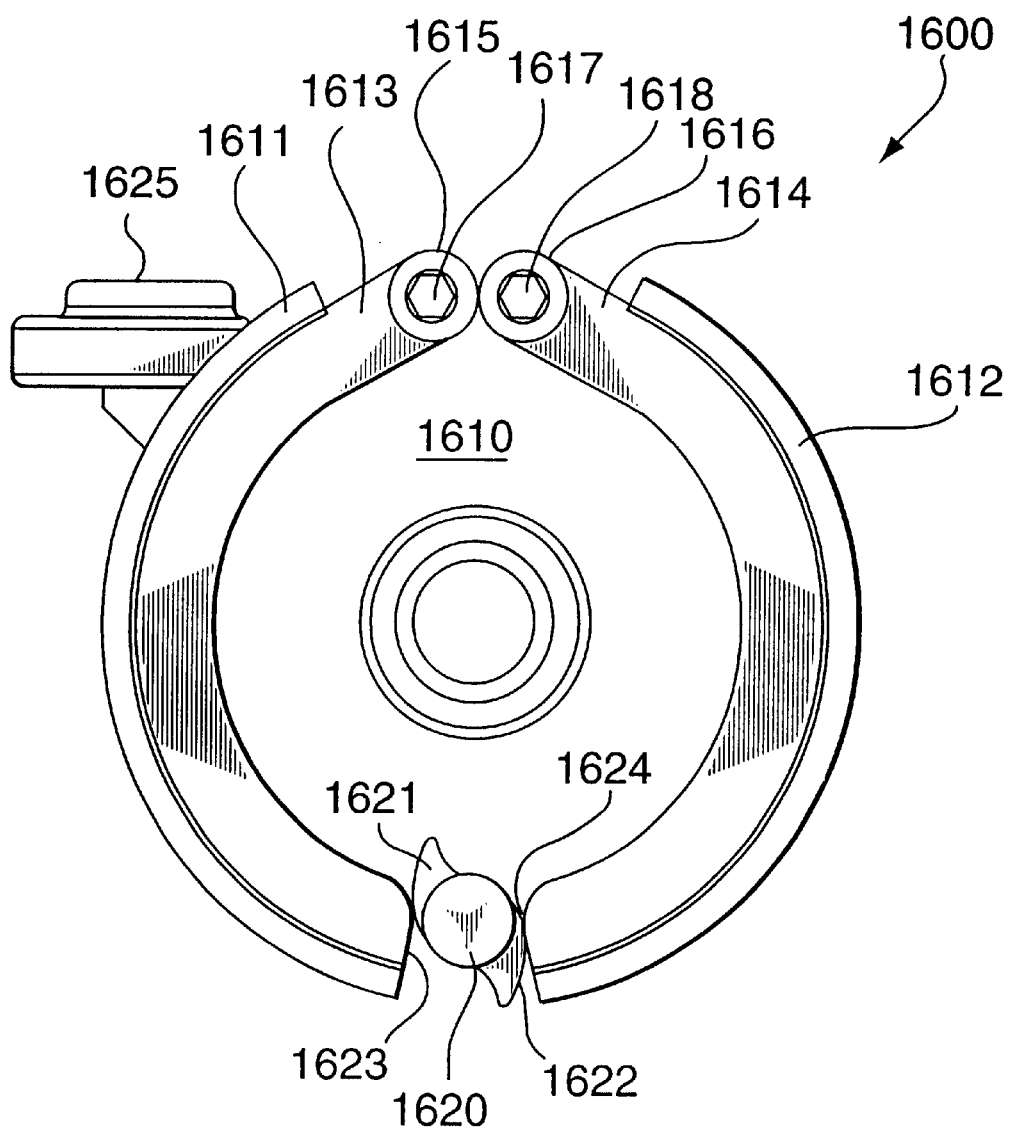
FIG. 16 is a side view of a prior art "cam" actuator system, provided for comparison.

(viii) Description of FIG. 16

FIG. 16 shows a cam braking actuation system 1600 according to the prior art. It includes a pair of arcuate brake pads 1611,1612 and a pair of arcuate brake shoes 1613,1614. Brake shoe 1613 is pivotally-secured at its upper end 1615 by pivot bolt 1617 to backup plate 1610. Similarly, brake shoe 1614 is pivotally-secured at its upper end 1616 by pivot bolt 1618 to backup plate 1610.

At the lower end of the brake shoes a cam 1620 is provided having camming surfaces 1621,1622. Camming surface 1621 engages the lower end 1623 of brake shoe 1613 to force the brake shoe to rotate in a clockwise direction to engage the brake pad 1611. Similarly, camming surface 1622 engages the lower end 1624 of the brake shoe 1614 to force the brake shoe to rotate in a clockwise direction to engage brake pad 1612.

DESCRIPTION OF PREFERRED EMBODIMENTS

Before describing preferred embodiments of this invention, it is desired to explain that the present invention is particularly-adapted to provide a brake system which is related to the braking system of the above-identified U.S. Pat. No. 5,865,277. Thus, the present invention is particularly-adapted to be used in a vehicle braking system with a wheel for use with a rotatably-driven or free-wheeling rotatable wheel support which is secured to a non-rotational part of the vehicle along the rotational axis of the wheel. The wheel support includes a plurality of brake arms, each brake arm having radially-opposed outer curved arcuate surfaces, the brake arms being mounted upon the non-rotatable part of the vehicle in spaced positions around the rotational axis of the wheel support. An operating system is provided for moving the brake arms in a braking action radially-outwardly from first stationary inactive positions to second stationary active positions and for returning the brake arms radially-inwardly from the second stationary active positions to the first stationary inactive positions upon termination of the braking action, and for moving the brake arms to third stationary positions which are further radially-inwardly beyond the first stationary inactive position. In this preferred environment to which the present invention is adapted the wheel comprises a generally-cylindrical wheel rim for mounting a tire thereon, a wheel disc carrying the wheel rim and extending radially-inwardly from the generally-cylindrical wheel rim towards a rotational axis of the wheel for mounting the wheel upon the rotatably-driven, or freewheeling, rotatable wheel support of the vehicle, a cylindrical support which is secured to the wheel disc and which is radially-inwardly-disposed of the generally-cylindrical wheel rim, and radially-inwardly-facing arcuate brake linings of constant radius for resisting heat caused by friction, the arcuate brake linings being secured to the cylindrical support, the arcuate brake linings extending at least partially-around, and having a centre of radius coincident with, the rotational axis of the wheel, whereby replacement brake linings are provided when a wheel with a tire mounted thereon replaces a wheel with tire thereon which has been removed; whereby, on braking action, the radially-opposed outer curved surfaces of the brake arms are moved towards, and frictionally-engage, the radially-inwardly-facing brake linings which are secured to the wheel.

In particular, the present invention is an improvement on the braking system described in the above-identified pending patent application. Thus, the present invention is an improvement on a braking system for an automotive vehicle which includes the following, in combination: Firstly, a wheel comprising a generally-cylindrical wheel rim for mounting a tire thereon, a wheel disc carrying the wheel rim and extending radially-inwardly from the generally-cylindrical wheel rim towards a rotational axis of the wheel for mounting the wheel upon a rotatably-driven, or free-wheeling rotatable wheel support of a vehicle, a cylindrical support which is secured to the wheel disc and which is radially-inwardly disposed of the generally-cylindrical wheel rim, and a pair of diametrically-opposed, radially-inwardly-facing arcuate brake linings of constant radius for resisting heat caused by friction, the arcuate brake linings are secured to the cylindrical support, the arcuate brake linings extending at least partially-around, and having a centre of radius which is coincident with, the rotational axis of the wheel. Secondly, a rotatably-driven or free-wheeling wheel support which is secured to a non-rotational part of the vehicle along the rotational axis of the wheel, a pair of diametrically-opposed brake arms, each the brake arm has radially-opposed outer curved arcuate surfaces, the brake arms are mounted upon the non-rotatable part of the vehicle in spaced positions around the rotational axis of the wheel support, respective ends of the arcuate brake arms are secured to one another by means of tension springs, and an operating system for moving the brake arms radially-outwardly from first stationary inactive positions, where the brake arms are out of contact with the brake linings to second stationary active positions, where the brake arms are in contact with the brake linings, and for returning the brake arms radially-inwardly from the second stationary active positions to the first stationary inactive positions, and for moving the brake arms to third non-braking stationary positions which are further radially-inwardly beyond the first stationary inactive position, the operating system comprises a disc which is rotatably-attached to the wheel support, the disc includes a pair of diametrically-opposed links, each link are secured to an associated one of the brake arms, the disc also includes an operating finger which is connected to an operating cable, whereby, on operating the operating cable to rotate the disc in a counter-clockwise direction, the radially-opposing outer curved surfaces of the brake arms are moved towards, and frictionally-engage, the radially-inwardly-facing brake linings which are secured to the wheel.

(i) Description of FIGS. 9 to 15

One embodiment of the present invention will now be described in reference to FIGS. 9 to 15.

The rim brake assembly 900 includes a cylindrical axle casing 910 within which is the usual axle 911 having a main cylindrical portion 911a, a frusto-conical portion 911b and a terminal cylindrical portion 911c of lesser diameter than main portion 911a. A brake arm assembly generally indicated as 912 is concentrically-disposed around the axle 911. The brake arm assembly 912 includes an upper arcuate brake arm 913, and a lower arcuate brake arm 914. The upper arcuate brake arm 913 is provided on its underside with an arcuate channel member 915. Arcuate channel member 915 terminates at one end 917 in a pair of transversely-spaced-apart ears 919,921, which are each provided with an aligned aperture 923, and terminates at its other end 925 in a main hollow cylindrical bushing 927.

The lower arcuate brake arm 914 is provided on its underside with an arcuate channel member 916. Arcuate channel member 916 terminates at one end 918 in a pair of transversely-spaced-apart ears 920,922, which are each provided with an aligned aperture 922, and terminates at its other end 926 in a main hollow cylindrical bushing 928.

The upper arcuate channel member 913 is associated with a bifurcated link 929, comprising two transversely-spaced-apart arms 931,933, which are each provided with an aligned aperture 935, and which are connected by a secondary hollow cylindrical bushing 937. Secondary hollow cylindrical bushing 937 is rotationally-held between ears 919,921 by pin 939 passing through aligned apertures 923 and the hollow core of secondary hollow cylindrical bushing 937.

The lower arcuate channel member 914 is associated with a bifurcated link 930, comprising two transversely-spaced-apart arms 932,934, which are each provided with an aligned aperture 936, and which are connected by a secondary hollow cylindrical bushing 938. Secondary hollow cylindrical bushing 938 is rotationally-held between ears 920,922 by pin 940 passing through aligned apertures 924 and the hollow core of secondary hollow cylindrical bushing 938.

An inner anchor plate 940 is fixedly-secured to an end 942 of the axle casing 910, with the axle 911a projecting through a central aperture 944 therethrough.

The inner anchor plate 940 is provided with five apertures to accommodate five spacer bolt assemblies 946, 948, 950, 952, 954. Each spacer bolt assembly 946, 948, 950, 952, 954 includes a tapped hollow cylindrical member 947, 949, 951, 953, 955, respectively, which is adapted to be secured to the inner anchor plate 940 by means (not seen). The main hollow cylindrical bushing 927 of the upper arcuate channel member 913 is rotatably-disposed around the tapped hollow cylindrical member 947 of the spacer bolt assembly 946, and the aligned apertures 936 of bifurcated link 930, which has been secured to the lower arcuate channel member 914, is disposed around the tapped hollow cylindrical member 949 of the spacer bolt assembly 948. Similarly, the main hollow cylindrical bushing 928 of the lower arcuate channel member 914 is rotatably-disposed around the tapped hollow cylindrical member 953 of the spacer bolt assembly 952, and the aligned apertures 935 of bifurcated link 929 which has been secured to the upper arcuate channel member 913 which is rotatably-disposed around the tapper hollow cylindrical member 953 of the spacer bolt assembly 950.

An asymmetrical operator assembly 960 including a hollow cylindrical hub 962 to fit around the axle 91 la and an ear 964 having an aperture 965 therethrough, is placed against bushing 966 at end 967 of the cylindrical axle casing 910. Operator assembly 960 is secured to bushing 967 by means of pins 969.

An outer anchor plate 970 abutted against operator assembly 960 and is then secured to the inner anchor plate 940 by the use of bolts 971,972,973,974,975 secured into the tapped outer ends of the five spacer bolt assemblies 946,948,950, 952,954, respectively. It is noted that four of the spacer bolt assemblies 946,948,950 and 952 are used to secure the brake arm assembly 912 to the anchor plates 940,970, while the fifth spacer bolt assembly 954 is used to assure securement of the two anchor plates 940,970 together. The operator assembly 960 is thus disposed between the two arms 932, 934 at the bifurcated link 930. A brake actuator bar 980 is secured to the aperture 965 in the ear 964 of the operator assembly 960.

Secured to the outer surface 990 of the axle housing 910 is an air chamber mount 991. An air chamber 992 known as an "air pot" is mounted on mount 991. Air pot 992 includes a depending push rod 993 which is secured to the transverse brake actuator bar.

The push rod may be provided with serrated teeth cooperating with a release pawl (not seen) which may be secured to transverse angle bar 994. Should air accidentally be lost during braking action, the pawl would hold the push rod 993 down, and thus maintain the integrity of the brake system.

OPERATION OF THE EMERGENCY BRAKE SYSTEMS OF THE PRIOR ART

A description of the operation of the emergency braking systems of the prior art will now be given.

(i) Operation of the Emergency Brake of FIG. 4

The emergency brake is normally held in its "released" position by air pressure. Pressure to the control valve assembly is provided in the usual manner well-known to those skilled in the art.

To operate the emergency brake shown in FIG. 4, and referring also to FIG. 1, the diaphragm is actuated by pulling the conventional brake cable (not shown) which allows compressed air which is received from a control line extending from a service gladhand which is also connected to a compressor supply source. This, in turn, operates to pull the push rod, which rotates the actuator disc in a counter-clockwise direction, until the links move the brake arms radially-outwardly to apply sufficient braking pressure to the surfaces of the brake linings.

To release the emergency brakes, the conventional brake cable is released, which allows compressed air to exhaust through a relief valve. This, in turn, operates to pull the push rod, which rotates the actuator disc in a clockwise direction until the links move the brake arms radially-inwardly to relieve the braking pressure.

(ii) Operation of the Emergency Brake of FIG. 5

To operate the emergency brake shown in FIG. 5, and referring also to FIG. 1, the diaphragm is activated by pulling the conventional brake cable (not shown) which allows compressed air which is received from a control line extending from a service gladhand which is also connected to a compressor supply source. This, in turn, operates to pull the push rod, which rotates the actuator disc in a counter-clockwise direction, until the links move the brake arms radially-outwardly to apply sufficient braking pressure to the surfaces of the brake linings.

To release the emergency brakes, the conventional brake cable is release, which allows compressed air to exhaust through a relief valve. This, in turn, operates to pull the push rod, which rotates the actuator disc in a clockwise direction until the links move the brake arms radially-inwardly to relieve the braking pressure.

(iii) Operation of the Emergency Brake of FIG. 6

To operate the emergency brake shown in FIG. 6, and referring also to FIG. 1, the diaphragm is activated by pulling the conventional brake cable (not shown) which allows compressed air which is received from a control line extending from a service gladhand which is also connected to a compressor supply source. This, in turn, operates to pull the push rod, which rotates the actuator disc in a counter-clockwise direction, until the links move the brake arms radially-outwardly to apply sufficient braking pressure to the surfaces of the brake linings.

To release the emergency brakes, the conventional brake cable is released, which allows compressed air to exhaust through a relief valve. This, in turn, operates to push the push rod, which rotates the actuator disc in a clockwise direction until the links move the brake arms radially-inwardly to relieve the braking pressure.

(iv) Operation of the Emergency Brake of FIG. 7

To operate the emergency brake shown in FIG. 7, and referring also to FIG. 1, the diaphragm is activated by pulling the conventional brake cable (not shown) which allows compressed air which is received from a control line extending from a service gladhand which is also connected to a compressor supply source. This, in turn, operates to pull the push rod, which rotates the actuator disc in a counter-clockwise direction, until the links move the brake arms radially-outwardly to apply sufficient braking pressure to the surfaces of the brake linings.

To release the emergency brakes, the conventional brake cable is release, which allows compressed air to exhaust through a relief valve. This, in turn, operates the push rod, which rotates the actuator disc in a clockwise direction until the links move the brake arms radially-inwardly to relieve the braking pressure.

(v) Operation of the Emergency Brake of FIG. 8

To operate the emergency brake shown in FIG. 8, and referring also to FIG. 1, the diaphragm is activated by pulling the conventional brake cable (not shown) which allows compressed air which is received from a control line extending from a service gladhand which is also connected to a compressor supply source. This, in turn, operates the push rod, which rotates the actuator disc in a counter-clockwise direction, until the links move the brake arms in a sliding fashion radially-outwardly within the confines of the vertical slots in the mounting bracket, delimited by the stop pins to apply sufficient braking pressure to the surfaces of the brake linings.

To release the emergency brakes, the conventional brake cable is released, which allows compressed air to exhaust through a relief valve. This, in turn, operates the push rod, which rotates the actuator disc in a clockwise direction until the links move the brake arms radially in an inwardly-sliding movement of the brake arms to relieve the braking pressure.

(vi) Orientation of the Brake of FIG. 16

Cam 1620 is rotated by means of a pneumatic motor (not shown) operated by compressed air from air pot 1625, to rotate the cam either in the clockwise direction to engage the brake or in the counter-clockwise direction to disengage the brake.

OPERATION OF THE BRAKE OF FIGS. 9 to 15 OF THE PRESENT INVENTION

When the brake is activated, the air is released from the air pot and the push rod is urged downwardly. This, in turn, pushes the transverse brake activator bar downwardly, causing the actuator assembly to rotate counter-clockwise, thus causing the anchor plates to rotate in a counter-clockwise direction, and thus to move the brake arms against the brake pads.

Re-pressurizing the air pot causes reverse action, to release the brakes.

The system of the present invention is not contingent on being adjusted. The stroke of the spring brake is about 3.07" and is an off-the-shelf air pot. The activator is initially set-up to be pushed about 2.5" by the air pots. After that point, if the friction material was to be worn-down to metal-on-metal, there would still be room for more application.

As a safeguard, the ratchet with vertical teeth would lessen the use of the air compressor. If it were to fail, the air brake would still have the needed stoke to bring the vehicle to a stop. The air pot may need a longer stoke. If this was the case, the ratchet would take-up slack, alleviating the compressor from running unnecessarily. If the ratchet were to fail, the air supply may not keep-up and thus the spring in the conventional air pot would lock-up the brakes. This is the second back-up. The driver will not be able to continue until the air supply is built back up again.

CONCLUSION

From the foregoing description, one skilled in the art can easily-ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What is claimed is:

1. An actuator system for a brake system of the type including a brake and a source of compressed air which is connected to an air pot including a push rod for operating a transverse brake actuator bar between a brake applied position and a brake released position, said actuator system comprising:

an asymmetric operator member which is relatively-rotatably-attached to a non-rotatable wheel support, and is concentrically-disposed around an axle of a wheel, said asymmetric operator member including an ear which is attached to said transverse brake actuator bar;

a brake arm assembly comprising a pair of diametrically-opposed arcuate brake arms, each said brake arm including an inner arcuate channel member, one end of said arcuate channel member terminating in a hollow cylindrical bushing, the other end of said channel member terminating in a pair of transversely-spaced-apart ears having aligned apertures therethrough;

an inner anchor plate and an outer anchor plate sandwiching said asymmetric operator member therebetween and also being relatively-rotatably-attached to said non-rotatable wheel support concentrically-disposed around said axle of said wheel, said anchor plates being non-rotatably-secured to said asymmetric operator member;

a first bifurcated link which is rotatably-attached between the ears of a first channel member and said anchor plates;

a second bifurcated link which is rotatably-attached between the ears of a second channel member and said anchor plates;

a first hollow cylindrical bushing which is rotatably-attached to said anchor plates opposite to the attachment of said second bifurcated link; and a second hollow cylindrical bushing which is rotatably-attached to said anchor plates opposite to the attachment of said first bifurcated link;

whereby on activating said air pot, said push rod moves said transverse actuator bar to rotate said asymmetric operator member in a counter-clockwise direction, to urge said arcuate brake arm to move in a braking action radially-outwardly from an inactive position towards, and fictionally-engaging, radially-inwardly-facing brake pads, and on venting compressed air from said air pot, said push rod in said air pot moves said transverse actuator bar to rotate said asymmetric operator member in a clockwise direction, to urge said arcuate brake arms to move in a brake releasing action radially-inwardly to inactive positions away from, and out of frictional engagement with, said radially-inwardly-facing brake pads.

2. The actuator system as claimed in claim 1, wherein said inner anchor plate includes a pair of diametrically-spaced-apart outer axle rods within which said hollow cylindrical bushings are concentrically-rotatably-disposed.

3. The actuator system as claimed in claim 1, wherein said inner anchor plate includes a pair of diametrically-spaced-apart inner axle rods by means of which said bifurcated links are rotatably-secured to said ears of said inner arcuate channel.

4. The actuator system as claimed in claim 1, wherein said wheel includes a cylindrical support which comprises a radially-inwardly-facing surface extending substantially-continuously-around the rotational axis of the wheel.

5. The actuator system as claimed in claim 4, wherein said brake pads are rigidly-secured to said cylindrical support.

6. The actuator system as claimed in claim 4, wherein said brake pads are secured to a brake lining carrier, said brake lining carrier being detachably-mounted, but securely-mounted on said cylindrical support, with said brake pads facing radially-inwardly towards said rotational axis of said wheel.

7. The actuator system as claimed in claim 4, wherein said cylindrical support comprises: a radially-inwardly-directed cylindrical support surface to which said brake pads are secured; wherein said brake lining carrier has an outer circumferential surface which is complementary to said cylindrical support surface; and including securing members for securing said brake lining carrier to said cylindrical support surface.

8. The actuator system as claimed in claim 4, wherein said cylindrical support surface and said circumferential surface are each cylindrical and are complementary to one another.

9. The actuator system as claimed in claim 8, wherein said securing members comprise a plurality of screws which are spaced-apart angularly-around said rotational axis of said wheel and which radially-extend through respective aligned holes in said brake lining carrier and in said cylindrical support.

10. The combination of:
A) a brake system comprising a brake and a source of compressed air which is connected to an air pot including a push rod for moving a transverse brake actuator bar between a brake applied position and a brake released position, said push rod operating said transverse brake actuator bar; and
B) an actuator system comprising an asymmetric operator member which is relatively-rotatably-attached to a non-rotatable wheel support, and is concentrically-disposed around an axle of a wheel, said asymmetric operator member including an ear which is attached to said transverse brake actuator bar; a brake arm assembly comprising a pair of diametrically-opposed arcuate brake arms, each said brake arm including an inner arcuate channel member, one end of said arcuate channel member terminating in a hollow cylindrical bushing, the other end of said channel member terminating in a pair of transversely-spaced-apart ears having aligned apertures therethrough; an inner anchor plate and an outer anchor plate sandwiching said asymmetric operator member therebetween and also being relatively-rotatably-attached to said non-rotatable wheel support concentrically-disposed around said axle of said wheel, said anchor plates being non-rotatably-secured to said asymmetric operator member; a first bifurcated link which is rotatably-attached between the ears of a first channel member and said anchor plates; a second bifurcated link which is rotatably-attached between the ears of a second channel member and said anchor plates; a first hollow cylindrical bushing which is rotatably-attached to said anchor plates opposite to the attachment of said second bifurcated link; and a second hollow cylindrical bushing which is rotatably-attached to said anchor plates opposite to the attachment of said first bifurcated link;
whereby on activating said air pot, said push rod moves said transverse actuator bar to rotate said asymmetric operator member in a counter-clockwise direction, to urge said arcuate brake arm to move in a braking action radially-outwardly from an inactive position towards, and fictionally-engaging, radially-inwardly-facing brake pads, and on venting compressed air from said air pot, said push rod in said air pot moves said transverse actuator bar to rotate said asymmetric operator member in a clockwise direction, to urge said arcuate brake arms to move in a brake releasing action radially-inwardly to inactive positions away from, and out of frictional engagement with, said radially-inwardly-facing brake pads.

11. The combination as claimed in claim 10, wherein said air pot includes a first diaphragm for applying pressure to said push rod, said diaphragm being supplied with pressurized air from a service reservoir.

12. The combination as claimed in claim 10, wherein said air pot includes a second diaphragm for applying pressure to said push rod, said second diaphragm being operated by a spring within said air pot.

13. The combination as claimed in claim 11, wherein said air pot includes a second diaphragm for applying pressure to said push rod, said second diaphragm being operated by a spring within said air pot.

14. The combination of:
A) a brake system comprising a brake and a source of compressed air which is connected to an air pot including a push rod for moving a transverse brake actuator bar between a brake applied position and a brake released position, said push rod operating said transverse brake actuator bar; and
B) an actuator system comprising an asymmetric operator member which is relatively-rotatably-attached to a non-rotatable wheel support, and is concentrically-disposed around an axle of a wheel, said asymmetric operator member including an ear which is attached to said transverse brake actuator bar; a brake arm assembly comprising a pair of diametrically-opposed arcuate brake arms, each said brake arm including an inner arcuate channel member, one end of said arcuate channel member terminating in a hollow cylindrical bushing, the other end of said channel member terminating in a pair of transversely-spaced-apart ears having aligned apertures therethrough; an inner anchor plate and an outer anchor plate sandwiching said asymmetric operator member therebetween and also being relatively-rotatably-attached to said non-rotatable wheel support concentrically-disposed around said axle of said wheel, said anchor plates being non-rotatably-secured to said asymmetric operator member; a first bifurcated link which is rotatably-attached between the ears of a first channel member and said anchor plates; a second bifurcated link which is rotatably-attached between the ears of a second channel member and said anchor plates; a first hollow cylindrical bushing which is rotatably-attached to said anchor plates opposite to the attachment of said second bifurcated link; and a second hollow cylindrical bushing which is rotatably-attached to said anchor plates opposite to the attachment of said first bifurcated link;
whereby on activating said air pot, said push rod moves said transverse actuator bar to rotate said asymmetric operator member in a counter-clockwise direction, to urge said arcuate brake arm to move in a braking action radially-outwardly from an inactive position towards, and fictionally-engaging, radially-inwardly-facing brake pads, and on venting compressed air from said air pot, said push rod in said air pot moves said transverse actuator bar to rotate said asymmetric operator member in a clockwise direction, to urge said arcuate brake arms to move in a brake releasing action radially-inwardly to inactive positions away from, and out of frictional engagement with, said radially-inwardly-facing brake pads; and wherein said air pot includes a first diaphragm for applying pressure to said push rod, said diaphragm being supplied with pressurized air from a service reservoir.

15. The combination of:
A) a truck, truck-trailer or semi-truck, said truck-trailer or semi-truck having a plurality of axles, each axle having a pneumatically-operated drum brake assembly at each end thereof, and an axle casing housing said axle;
B) a brake system comprising a brake and a source of compressed air which is connected to an air pot including a push rod for moving a transverse brake actuator bar between a brake applied position and a brake released position, said push rod operating said transverse brake actuator bar; and C) an actuator system comprising an asymmetric operator member which is relatively-rotatably-attached to a non-rotatable wheel support, and is concentrically-disposed around an axle of a wheel, said asymmetric operator member including an ear which is attached to said transverse brake actuator bar; a brake arm assembly comprising a pair of diametrically-opposed arcuate brake arms, each said brake arm including an inner arcuate channel member, one end of said arcuate channel member terminating in a hollow cylindrical bushing, the other end of said channel member terminating in a pair of transversely-spaced-apart ears having aligned apertures therethrough; an inner anchor plate and an outer anchor plate sandwiching said asymmetric operator member therebetween and also being relatively-rotatably-attached to said non-rotatable wheel support concentrically-disposed around said axle of said wheel, said anchor plates being non-rotatably-secured to said asymmetric operator member; a first bifurcated link which is rotatably-attached between the ears of a first channel member and said anchor plates; a second bifurcated link which is rotatably-attached between the ears of a second channel member and said anchor plates; a first hollow cylindrical bushing which is rotatably-attached to said anchor plates opposite to the attachment of said second bifurcated link; and a second hollow cylindrical bushing which is rotatably-attached to said anchor plates opposite to the attachment of said first bifurcated link;

whereby on activating said air pot, said push rod moves said transverse actuator bar to rotate said asymmetric operator member in a counter-clockwise direction, to urge said arcuate brake arm to move in a braking action radially-outwardly from an inactive position towards, and fictionally-engaging, radially-inwardly-facing brake pads, and on venting compressed air from said air pot, said push rod in said air pot moves said transverse actuator bar to rotate said asymmetric operator member in a clockwise direction, to urge said arcuate brake arms to move in a brake releasing action radially-inwardly to inactive positions away from, and out of frictional engagement with, said radially-inwardly-facing brake pads.

16. The combination as claimed in claim 15, including an air chamber mount secured to said axle casing adjacent to each end of said axle casing, and an air chamber mounted on said air chamber mount, said air chamber being connected to a source of compressed air.

17. The combination as claimed in claim 15, including a transverse angle bar secured to said axle casing, and including a release pawl secured to said transverse angle bar, said push rod including vertical teeth thereon cooperating with said release pawl, whereby accidental release of air pressure other than at said air pot causes said release pawl to hold said push rod down, and thereby to maintain a braking action.

18. The combination as claimed in claim 16, including a transverse angle bar secured to said axle casing, and including a release pawl secured to said transverse angle bar, said push rod including vertical teeth thereon cooperating with said release pawl, whereby accidental release of air pressure other than at said air pot causes said release pawl to hold said push rod down, and thereby to maintain a braking action.

19. The combination, as claimed in claim 15, wherein said push rod is operatively-associated with a transverse actuator bar which is operatively-connected to said asymmetric member, whereby, when said push rod moves downwardly said transverse actuator bar is caused to rotate said asymmetric operator member in a counter-clockwise direction, to cause a braking action, and when said push rod moves upwardly said transverse actuator bar is caused to rotate said asymmetric member in a clockwise direction, to cause a brake releasing action.

20. The combination as claimed in claim 15, including an air chamber mount which is secured to said axle casing adjacent to each end of said axle casing, and an air chamber which is mounted on said air chamber mount, said air chamber being connected to a source of compressed air, and including a transverse angle bar which is secured to said axle casing, and further including a release pawl which is secured to said transverse angle bar, said push rod including vertical teeth thereon cooperating with said release pawl, whereby accidental release of air pressure other than at said air chamber causes said release pawl to hold said push rod down, and thereby to maintain a braking action.

21. The combination as claimed in claim 15, including an air chamber mount which is secured to said axle casing adjacent to each end of said axle casing, and an air chamber which is mounted on said air chamber mount, said air chamber being connected to a source of compressed air, and wherein said push rod is operatively-associated with a transverse actuator bar which is operatively-connected to said asymmetric member;

whereby, when said push rod moves downwardly said transverse actuator bar is caused to rotate said asymmetric operator member in a counter-clockwise direction, to cause a braking action, and when said push rod moves upwardly said transverse actuator bar is caused to rotate said asymmetric member in a clockwise direction, to cause a brake releasing action.

22. The combination as claimed in claim 15, including an air chamber mount which is secured to said axle casing adjacent to each end of said axle casing, and an air chamber which is mounted on said air chamber mount, said air chamber being connected to a source of compressed air, and including a transverse angle bar which is secured to said axle casing, and further including a release pawl which is secured to said transverse angle bar, said push rod including vertical teeth thereon cooperating with said release pawl, whereby accidental release of air pressure other than at said air pot causes said release pawl to hold said push rod down, and thereby to maintain a braking action, said push rod being operatively-associated with a transverse actuator bar which is operatively-connected to said asymmetric member;

whereby, when said push rod moves downwardly said transverse actuator bar is caused to rotate said asymmetric operator member in a counter-clockwise direction, to cause a braking action, and when said push rod moves upwardly said transverse actuator bar is caused to rotate said asymmetric member in a clockwise direction, to cause a brake releasing action.

* * * * *